(12) United States Patent
Gunningham et al.

(10) Patent No.: US 10,255,295 B2
(45) Date of Patent: Apr. 9, 2019

(54) AUTOMATIC COLOR VALIDATION OF IMAGE METADATA

(71) Applicant: Amazon Technologies, Inc., Reno, NV (US)

(72) Inventors: Sebastian Jorge Gunningham, Fall City, WA (US); Paul Barnhart Sayre, III, Gig Harbor, WA (US); Charles Shearer Dorner, Seattle, WA (US); Robert Yuji Haitani, Seattle, WA (US); Gonzalo Alberto Ramos, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 5 days.

(21) Appl. No.: 14/315,932

(22) Filed: Jun. 26, 2014

(65) Prior Publication Data

US 2015/0379001 A1    Dec. 31, 2015

(51) Int. Cl.
   *G06F 17/30* (2006.01)
(52) U.S. Cl.
   CPC .... *G06F 17/3025* (2013.01); *G06F 17/30268* (2013.01)
(58) Field of Classification Search
   CPC .................................................. G06F 17/3025
   See application file for complete search history.

(56) References Cited

U.S. PATENT DOCUMENTS

| 5,508,718 A | 4/1996 | Haikin |
| 5,544,284 A | 8/1996 | Allebach et al. |
| 5,684,895 A | 11/1997 | Harrington |
| 5,822,503 A | 10/1998 | Gass, Jr. et al. |
| 6,014,125 A | 1/2000 | Herbert |
| 6,041,311 A | 3/2000 | Chislenko et al. |
| 6,081,276 A * | 6/2000 | Delp .......................... G01J 3/46 345/589 |

(Continued)

FOREIGN PATENT DOCUMENTS

| CN | 107077474 A | 8/2017 |
| CN | 107077698 A | 8/2017 |

(Continued)

OTHER PUBLICATIONS

"Exalead CloudView Semantics Whitepaper," Doc. No. EN.140. 001.0-V1.2; Oct. 2010, pp. 1-30. Retrieved from http:www.3ds.com/fileadmin/PRODUCTS/EXALEAD/Documents/whitepapers/Exalead-CloudView-Semantics-EN.pdf on Aug. 24, 2015.

(Continued)

*Primary Examiner* — Amanda L Willis
(74) *Attorney, Agent, or Firm* — Knobbe, Martens, Olson & Bear, LLP

(57) ABSTRACT

Systems and methods are described that validate color information in metadata associated with an image. Color information associated with images, in metadata, may need to be validated because there may be mistakes in the metadata. Color names associated with colors may be based on human generated data or human surveys. Individual colors may be extracted from images, which may be associated with the color names. Furthermore, the color names may be retrieved from a data store via a fast index color search. The color information in the metadata may be validated against the color names.

20 Claims, 17 Drawing Sheets

(56) References Cited

U.S. PATENT DOCUMENTS

| | | | |
|---|---|---|---|
| 6,124,945 A | 9/2000 | Ishihara et al. | |
| 6,385,336 B1 | 5/2002 | Jin | |
| 6,513,014 B1 | 1/2003 | Walker et al. | |
| 6,577,759 B1 | 6/2003 | Caron et al. | |
| 7,136,074 B2 | 11/2006 | Hussie | |
| 7,444,658 B1 | 10/2008 | Matz et al. | |
| 7,801,893 B2 | 9/2010 | Gulli' et al. | |
| 7,961,938 B1 | 6/2011 | Remedios | |
| 8,393,002 B1 | 3/2013 | Kamvar et al. | |
| 8,416,255 B1 | 4/2013 | Gilra | |
| 8,553,045 B2 | 10/2013 | Skaff et al. | |
| 8,576,241 B1 | 11/2013 | Kanter et al. | |
| 8,587,604 B1 | 11/2013 | Kanter et al. | |
| 8,593,680 B2 | 11/2013 | Woolfe et al. | |
| 8,634,640 B2 | 1/2014 | Bhatti et al. | |
| 8,762,419 B2 | 6/2014 | Moroney | |
| 8,867,798 B2 | 10/2014 | Shuster | |
| 9,047,804 B1 | 6/2015 | Moroney et al. | |
| 9,135,719 B1 | 9/2015 | Dorner et al. | |
| 9,177,391 B1 | 11/2015 | Dorner et al. | |
| 9,245,350 B1 | 1/2016 | Dorner et al. | |
| 9,311,889 B1 | 4/2016 | Dorner et al. | |
| 9,396,560 B2 | 7/2016 | Dorner et al. | |
| 9,401,032 B1 | 7/2016 | Dorner et al. | |
| 9,514,543 B2 | 12/2016 | Dorner et al. | |
| 9,524,563 B2 | 12/2016 | Sayre et al. | |
| 9,542,704 B2 | 1/2017 | Dorner et al. | |
| 9,552,656 B2 | 1/2017 | Dorner et al. | |
| 9,633,448 B1 | 4/2017 | Dorner | |
| 9,652,118 B2 | 5/2017 | Hill et al. | |
| 9,652,868 B2 | 5/2017 | Gunningham et al. | |
| 9,659,032 B1 | 5/2017 | Dorner et al. | |
| 9,679,532 B2 | 6/2017 | Dorner et al. | |
| 9,697,573 B1 | 7/2017 | Haitani et al. | |
| 9,727,983 B2 | 8/2017 | Dorner et al. | |
| 9,785,649 B1 | 10/2017 | Dorner et al. | |
| 9,792,303 B2 | 10/2017 | Sayre, III et al. | |
| 9,898,487 B2 | 2/2018 | Sayre, III et al. | |
| 9,916,613 B1 | 3/2018 | Dorner et al. | |
| 9,922,050 B2 | 3/2018 | Dorner et al. | |
| 9,996,579 B2 | 6/2018 | Dorner et al. | |
| 10,049,466 B2 | 8/2018 | Dorner et al. | |
| 2001/0028464 A1 | 10/2001 | Aritomi | |
| 2002/0080153 A1 | 6/2002 | Zhao et al. | |
| 2003/0004938 A1 | 1/2003 | Lawder | |
| 2003/0011612 A1 | 1/2003 | Luo et al. | |
| 2003/0083850 A1 | 5/2003 | Schmidt et al. | |
| 2003/0142124 A1 | 7/2003 | Takata et al. | |
| 2003/0146925 A1 | 8/2003 | Zhao et al. | |
| 2004/0090453 A1 | 5/2004 | Jasinschi et al. | |
| 2005/0122427 A1 | 6/2005 | Hougui et al. | |
| 2005/0149411 A1 | 7/2005 | Colwell | |
| 2005/0222978 A1 | 10/2005 | Drory et al. | |
| 2006/0023082 A1 | 2/2006 | Higuchi | |
| 2006/0066629 A1 | 3/2006 | Norlander et al. | |
| 2006/0248081 A1 | 11/2006 | Lamy | |
| 2006/0250669 A1 | 11/2006 | Beretta | |
| 2006/0268120 A1 | 11/2006 | Funakura et al. | |
| 2007/0100786 A1 | 5/2007 | Moroney | |
| 2008/0003547 A1 | 1/2008 | Woolfe et al. | |
| 2008/0025629 A1 | 1/2008 | Obrador et al. | |
| 2008/0025647 A1 | 1/2008 | Obrador et al. | |
| 2008/0046410 A1 | 2/2008 | Lieb | |
| 2008/0046424 A1 | 2/2008 | Horton | |
| 2008/0069442 A1 | 3/2008 | Itoh | |
| 2008/0294600 A1 | 11/2008 | Clark et al. | |
| 2008/0301582 A1* | 12/2008 | Gluck | G06F 17/30867 715/811 |
| 2008/0317336 A1 | 12/2008 | Mojsilovic | |
| 2009/0027414 A1 | 1/2009 | Vaughn | |
| 2009/0041345 A1* | 2/2009 | Tirumalareddy | H04N 1/56 382/165 |
| 2009/0055758 A1 | 2/2009 | Sim et al. | |
| 2009/0157595 A1* | 6/2009 | Gubitz | G06F 9/4411 |
| 2009/0227375 A1 | 9/2009 | Weisman et al. | |
| 2009/0248626 A1 | 10/2009 | Miller | |
| 2009/0259567 A1 | 10/2009 | Watts | |
| 2009/0276388 A1 | 11/2009 | Martin et al. | |
| 2009/0281925 A1 | 11/2009 | Winter et al. | |
| 2010/0027834 A1 | 2/2010 | Spitzig et al. | |
| 2010/0053201 A1 | 3/2010 | Klassen et al. | |
| 2010/0082654 A1 | 4/2010 | Zhang et al. | |
| 2010/0110455 A1* | 5/2010 | Woolfe | G01J 3/46 358/1.9 |
| 2010/0158412 A1 | 6/2010 | Wang et al. | |
| 2011/0029510 A1 | 2/2011 | Kroon et al. | |
| 2011/0135195 A1 | 6/2011 | Marchesotti et al. | |
| 2011/0205231 A1 | 8/2011 | Hartley et al. | |
| 2011/0305386 A1 | 12/2011 | Wang et al. | |
| 2011/0319160 A1 | 12/2011 | Arn et al. | |
| 2012/0036163 A1 | 2/2012 | Myers et al. | |
| 2012/0045121 A1 | 2/2012 | Youngman et al. | |
| 2012/0075329 A1* | 3/2012 | Skaff | G09G 5/06 345/593 |
| 2012/0099784 A1 | 4/2012 | Marchesotti et al. | |
| 2012/0099788 A1 | 4/2012 | Bhatti et al. | |
| 2012/0109944 A1 | 5/2012 | Hao | |
| 2012/0154420 A1 | 6/2012 | Calandrino et al. | |
| 2012/0163710 A1 | 6/2012 | Skaff et al. | |
| 2012/0206477 A1 | 8/2012 | Yanagisawa | |
| 2013/0013991 A1 | 1/2013 | Evans | |
| 2013/0033603 A1 | 2/2013 | Suzuki et al. | |
| 2013/0050238 A1 | 2/2013 | Bergou et al. | |
| 2013/0148741 A1 | 6/2013 | Steinberg et al. | |
| 2013/0159100 A1 | 6/2013 | Raina et al. | |
| 2013/0226659 A1 | 8/2013 | Patel et al. | |
| 2013/0227636 A1 | 8/2013 | Bettini et al. | |
| 2013/0235398 A1 | 9/2013 | Bhatti et al. | |
| 2013/0266217 A1 | 10/2013 | Gershon et al. | |
| 2013/0300761 A1 | 11/2013 | Ahmed | |
| 2014/0037200 A1 | 2/2014 | Phillips et al. | |
| 2014/0037884 A1 | 2/2014 | Wambolt et al. | |
| 2014/0044349 A1 | 2/2014 | Wang et al. | |
| 2014/0049799 A1 | 2/2014 | Li et al. | |
| 2014/0052584 A1 | 2/2014 | Gershon et al. | |
| 2014/0067014 A1 | 3/2014 | Kaula et al. | |
| 2014/0089781 A1 | 3/2014 | Hoguet | |
| 2014/0153821 A1 | 6/2014 | Masuko et al. | |
| 2014/0177952 A1 | 6/2014 | Masuko | |
| 2014/0189476 A1 | 7/2014 | Berthelot et al. | |
| 2014/0270498 A1 | 9/2014 | Chester et al. | |
| 2014/0300775 A1 | 10/2014 | Fan et al. | |
| 2014/0304661 A1 | 10/2014 | Topakas et al. | |
| 2014/0334722 A1 | 11/2014 | Bloore et al. | |
| 2014/0355874 A1 | 12/2014 | Sakamaki et al. | |
| 2015/0235110 A1 | 8/2015 | Curtis et al. | |
| 2015/0235389 A1 | 8/2015 | Miller et al. | |
| 2015/0262549 A1 | 9/2015 | Moroney | |
| 2015/0269747 A1 | 9/2015 | Hogan et al. | |
| 2015/0324392 A1 | 11/2015 | Becker et al. | |
| 2015/0324394 A1 | 11/2015 | Becker et al. | |
| 2015/0332479 A1 | 11/2015 | Gershon et al. | |
| 2015/0356128 A1 | 12/2015 | Nishimura | |
| 2015/0378999 A1 | 12/2015 | Dorner et al. | |
| 2015/0379000 A1 | 12/2015 | Haitani et al. | |
| 2015/0379002 A1 | 12/2015 | Dorner et al. | |
| 2015/0379003 A1 | 12/2015 | Dorner et al. | |
| 2015/0379004 A1 | 12/2015 | Sayre et al. | |
| 2015/0379005 A1 | 12/2015 | Dorner et al. | |
| 2015/0379006 A1 | 12/2015 | Dorner et al. | |
| 2015/0379071 A1 | 12/2015 | Dorner et al. | |
| 2015/0379608 A1 | 12/2015 | Dorner et al. | |
| 2015/0379731 A1 | 12/2015 | Dorner et al. | |
| 2015/0379732 A1 | 12/2015 | Sayre et al. | |
| 2015/0379733 A1 | 12/2015 | Dorner et al. | |
| 2015/0379738 A1 | 12/2015 | Gunningham et al. | |
| 2015/0379739 A1 | 12/2015 | Dorner et al. | |
| 2015/0379743 A1 | 12/2015 | Dorner et al. | |
| 2015/0379959 A1 | 12/2015 | Dorner et al. | |
| 2016/0005188 A1 | 1/2016 | Dorner et al. | |
| 2016/0005201 A1 | 1/2016 | Kunkel et al. | |
| 2016/0104303 A1 | 4/2016 | Dorner et al. | |
| 2016/0335784 A1 | 11/2016 | Dorner et al. | |
| 2017/0084053 A1 | 3/2017 | Dorner et al. | |

(56) References Cited

U.S. PATENT DOCUMENTS

| | | | |
|---|---|---|---|
| 2017/0098314 | A1 | 4/2017 | Sayre et al. |
| 2017/0206061 | A1* | 7/2017 | Kumar .................... G06F 7/14 |
| 2017/0270620 | A1 | 9/2017 | Haitani et al. |
| 2018/0025002 | A1 | 1/2018 | Dorner et al. |
| 2018/0040142 | A1 | 2/2018 | Dorner et al. |
| 2018/0158128 | A1 | 6/2018 | Dorner et al. |
| 2018/0232414 | A1 | 8/2018 | Dorner et al. |

FOREIGN PATENT DOCUMENTS

| | | |
|---|---|---|
| EP | 3161677 | 5/2017 |
| EP | 3161770 | 5/2017 |
| JP | 2007-286767 A | 11/2007 |
| JP | 2009-181468 A | 8/2009 |
| JP | 2009-251850 A | 10/2009 |
| JP | 2011-154687 A | 8/2011 |
| JP | 2012-221317 A | 11/2012 |
| JP | 6315524 B2 | 4/2018 |
| WO | WO 2014/070914 A1 | 5/2014 |
| WO | WO 2015/145766 A1 | 10/2015 |
| WO | WO 2015/200502 A1 | 12/2015 |
| WO | WO 2015/200505 A1 | 12/2015 |
| WO | WO 2015/200509 A1 | 12/2015 |
| WO | WO 2015/200515 A1 | 12/2015 |
| WO | WO 2015/200523 A1 | 12/2015 |

OTHER PUBLICATIONS

Beretta, Giordano B., et al.; "Harmonious colors: from alchemy to science," Color Imaging XVII: Displaying Processing, Hardcopy, and Applications, SPIE vol. 8292, No. 1, pp. 1-7; Bellingham, WA; Jan. 22, 2012.

Csurka, Gabriela, et al.; "Learning moods and emotions from color combinations," Proceedings of the Seventh Indian Conference on Computer Vision, Graphics and Image Processing, pp. 298-305; New York; Dec. 12, 2010.

Das et al., "Indexing flowers by color names using domain knowledge-driven segmentation," Proc. The Fourth IEEE Workshop on Applications of Computer Vision; pp. 94-99; 1998.

Dorner, C.S., Automatic Image-Based Recommendations Using a Color Palette, U.S. Appl. No. 14/316,268, filed Jun. 26, 2014.

Global Color Survey, http://www.colorcom.com/global-color-survey, Feb. 1, 2001, accessed Sep. 11, 2015.

Heer, Jeffrey, et al.; "Color naming models for color selection, image editing and palette design," Proceedings of the 2012 ACM Annual Conference on Human Factors in Computing Systems, pp. 1007-1016; New York; May 5, 2012.

Lawder, Jonathan, "The Application of Space-filling Curves to the Storage and Retrieval of Multi-dimensional Data," PhD thesis; Sections 4.3.5.1, p. 68, and 6.5, pp. 121-130; Jan. 1, 2000.

Tremeau et al., "A vector quantization algorithm based on the nearest neighbor of the furthest color," Proceedings of International Conference on Image Processing, vol. 3, pp. 682-685, Oct. 26-29, 1997.

Tropf, H. et al., "Multidimensional range search in dynamically balanced trees," Angewandte Informatik (Applied Informatics), pp. 71-77; Braunschweig, Germany; Feb. 1, 1981.

Wang et al., "Contextual Dominant Color Name Extraction for Web Image Search," 2012 IEEE International Conference on Multimedia and Expo Workshops (ICMEW), pp. 319-324.

Zhu, Haiping, et al., "Deep into Color Names: Matching Color Descriptions by Their Fuzzy Semantics," Artificial Intelligence: Methodology, Systems, and Applications Lecture Notes in Computer Science; Lecture Notes in Artificial Intelligence, pp. 138-149; Jan. 1, 2006.

International Search Report and Written Opinion in PCT/US2015/037469 dated Oct. 1, 2015.

International Search Report and Written Opinion in PCT/US2015/037456 dated Sep. 9, 2015.

International Search Report and Written Opinion in PCT/US2015/037494 dated Sep. 14, 2015.

International Search Report and Written Opinion in PCT/US2015/037465 dated Oct. 27, 2015.

International Search Report and Written Opinion in PCT/US2015/037481 dated Sep. 14, 2015.

Bell, E., Color Detection: Technology on Heels With Lyst Engineering, dated Feb. 22, 2014, retrieved Apr. 7, 2014, <http://developers.lyst.com/data/images/2014/02/22/color-detection/>.

Luo, J., et al., "Novel Color Palettization Scheme for Preserving Important Colors," Proceedings SPIE 5008. Color Imaging VIII: Processing, Hardcopy, and Applications; Jan. 20, 2003.

Montagne, C., et al., "Adaptive Color Quantization Using the Baker's Transformation," J. Electronic Imaging 15(2), Apr.-Jun. 2006, 21 pages.

Periasamy, P.S., et al., "A Common Palette Creation Algorithm for Multiple Images with Transparency Information," Procedeedings of the International Conference on Advances in Computing, Control, and Telecommunication Techologies, IEEE 2009.

Yu, M.P. et al., "Contextual Algorithm for Color Quantization," J. Electronic Imaging 12(3):442-447, Jul. 2003.

Balasubramanian, Raja, et al.; Sequential Scalar Quantization of Color Images, Journal of Electronic Imaging, vol. 3, No. 1, pp. 45-59; Jan. 1994.

Color Blind Assistant, iPhone Apps Versions 2.61 and 2.62, release date Oct. 14-15, 2009, pp. 1-7.

Color Name & Hue, Wayback Machine Archive, May 16, 2013, pp. 1-17, <http://web.archive.org/web/20130516202647/http://www.color-blindness.com/color-name-hue>.

Das et al, Indexing Flower Patent Images Using Domain Knowledge, IEEE Intelligent Systems, vol. 14, No. 5; 1999; pp. 24-33.

Delon, J., et al., Automatic Color Palette, Proceedings of the International Conference on Image Processing, vol. 2, Sep. 11-14, 2005, pp. 706-709.

HTML Color Picker, Wayback Machine Archive, Feb. 15, 2013, 1 page, <http://web.archive.org/web/20130215181242/http://imagecolorpicker.com/>.

Nickerson, D., et al., Central Notations for ISCC-NBS Color Names, Journal of the Optical Society of America, vol. 31, pp. 587-591, Sep. 1941.

Tin Eye Labs, Wayback Machine Archive, Sep. 20, 2012, pp. 1-3, <http://web.archive.org/web/20120920051712/http://labs.tineye.com/color/>.

Manjunath, B.S.;Color and Texture Descriptors; 2001; IEEE; vol. 11 No. 6; pp. 703-714.

Office Action in European Application No. 15734006.8, dated Dec. 21, 2017.

Wang, Yi-Fan, et al., A personalized recommender system for the cosmetic business, Expert Systems with Applications 26 (2004); pp. 427-434.

U.S. Appl. No. 14/316,292, Building a Palette of Colors Based on Human Color Preferences, filed Jun. 26, 2014.

U.S. Appl. No. 14/450,032, Color Name Based Search, filed Aug. 1, 2014.

U.S. Appl. No. 15/955,591, Fast Color Searching, filed Apr. 17, 2018.

\* cited by examiner

AUTOMATIC COLOR VALIDATION OF IMAGE METADATA

BACKGROUND

Items that create a visual impression generally utilize color, at least in part, to generate the visual impression. A palette of colors can be used, e.g., with clothes, artwork, images, video, and other visual media or items to provide a certain or desired look and feel. A person may want to include a particular color or adhere to a color scheme when decorating a room, buying clothes, accessorizing a vehicle, or the like. The person may utilize a network resource, such as a commerce network site, to browse items associated with different colors. The items may be depicted in images, (e.g., photographs and videos) presented via the network site.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
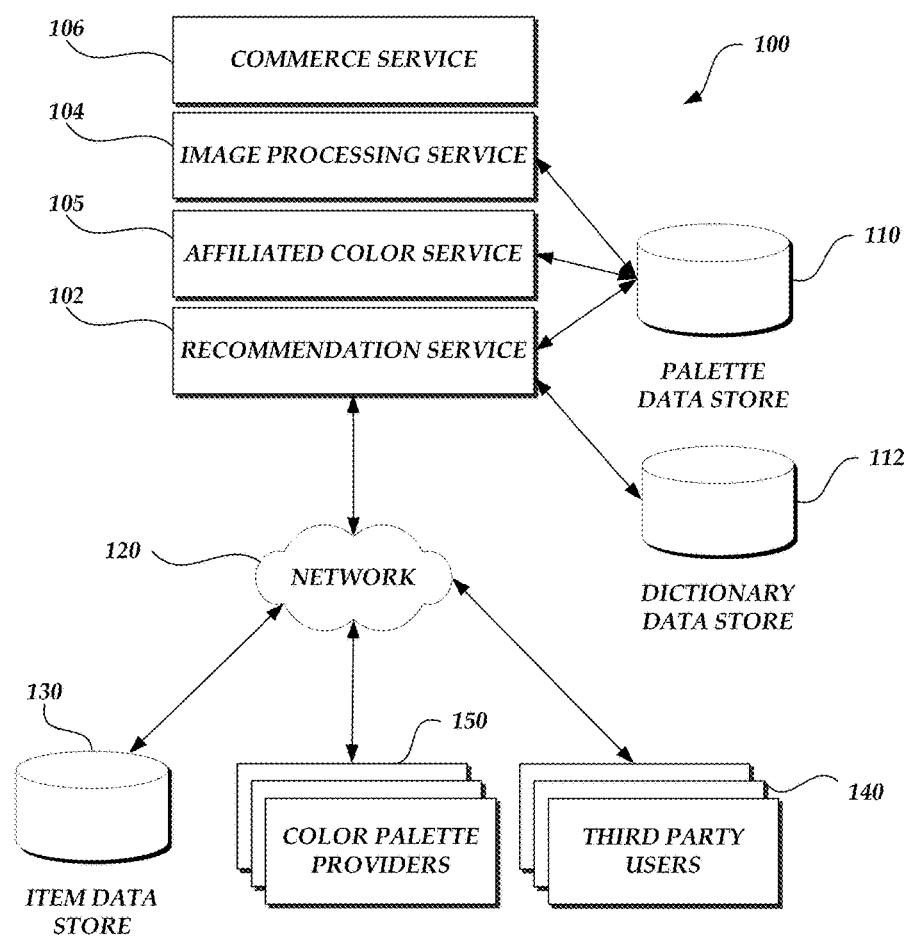
FIG. 1 is a block diagram illustrating an embodiment of an operating environment that includes an image processing service for analyzing color images based at least in part on a color palette, a recommendation service, and an affiliated color service.

Generally described, aspects of the present disclosure relate to providing search and recommendation tools that use color names and/or color palettes to identify, within a data store, relevant images, color palettes, keywords, metadata and the like. The present disclosure includes systems and methods configured to process a color or color palette name, identify a color or color palette from that name, and search among a data store of metadata, images, colors, keywords, and the like for relevant information.

Often a user visiting a networked site, such as a Website, may wish to browse a category of items (e.g., goods and/or services) that include a particular color or colors. In certain instances, users visiting the site may wish to locate an accessory or other item having a color that coordinates with a color palette, such as an item of clothing, furniture, appliances, housewares, etc. The color palette may be built from an initial color or colors by adding affiliated colors to the initial color(s). In other instances, a user may want to know what non-color specific keywords are associated with a color palette. In certain instances, a merchandiser may want to use a color palette to assemble a set of coordinating items from a catalog of items. In addition, it may be useful to validate image metadata, such as color names, to ensure that the color names in the metadata accurately correspond to known, expected or standard color names.

One or more of the various use cases discussed above are addressed by one or more embodiments disclosed herein. Aspects of the present disclosure relate to generating color-related recommendations and utilizing color names and/or color palettes that are collections of representative colors, each optionally associated with weight or other metadata, in generating recommendations. Yet other aspects of the present disclosure validate metadata associated with an image and/or generate metadata, such as color names, for an image. Yet further aspects of the present disclosure relate to identifying non-color specific keywords from a color name. Additional aspects of the present disclosure relate to generating affiliated color palettes from a color name.

In accordance with an illustrative embodiment, a recommendation service obtains a color palette and identifies color images depicting one or more items, a design, a scene, or the like, which corresponds to the color palette. The color palette can be input by a user, a host of a commerce or other network site, a merchandise provider, vendor, or other parties; generated from an image; generated from a color name; or the like. The color images may include metadata that provides additional information about the image, such as an item included in the image. The metadata can be used to provide search results and recommendations based on the color palette.

In accordance with another illustrative embodiment, a recommendation service can receive a reference color name and determine one or more images that contain the reference color name. The recommendation service can obtain metadata associated with the identified images and extract one or more color identifiers from the metadata. The recommendation service can then compare a reference color corresponding to the reference color name to colors corresponding to the one or more color identifiers in the metadata to validate the color identifiers. Where there are differences or where there is a lack of color identifiers, the recommendation service can modify the metadata to correct the color identifier information.

In accordance with another illustrative embodiment, a recommendation service can receive a reference color name and determine one or more keywords associated with the reference color name. The recommendation service can obtain a color name, such as through a text query, determine a color or colors in a color space that correspond to the color name, and determine keywords that are associated with the colors. The list of keywords can be sorted based on keyword rankings or weights and provided to a user, system or service.

In accordance with another illustrative embodiment, a color name can be used to identify one or more colors affiliated with the color corresponding to the color name. For example, a reference color name can be received and a plurality of palettes can be identified from a data store of palettes that contain that color (or a sufficiently similar color). From those palettes, a list of affiliated colors can be generated by identifying the other colors in the palettes. For each affiliated color in the list, a weight can be assigned based on the ranking, rating, and/or number of votes the containing palette has received. The list of affiliated colors can be ordered based on the assigned weights. The program or user can select an affiliated color from the ordered or weighted list to add to a custom color palette containing the reference color. When the selected affiliated color is added to the palette (or otherwise associated with the original color), a new list of affiliated colors can be generated based at least in part on the colors in the palette that allows the program or user to continue to build the color palette (or the associated grouping of affiliated colors).

In a further illustrative embodiment, the reference color can have a color distance threshold such that affiliated colors are identified where an affiliated color palette contains at least one color within the color distance threshold. Once the affiliated colors and/or affiliated color palette is determined, images containing the affiliated colors can be identified by comparing the colors in the affiliated color palette with colors extracted from an image. Metadata associated with the identified images can be provided where the metadata may provide additional information about the items in the images.

While a retail or commerce environment is often used as an example below, it will be appreciated that image, data, and/or color identification from keyword and/or text searching of color palettes, as disclosed herein, may be used in a variety of environments other than a retail environment. For example, aspects of the present disclosure, in some embodiments, may be used and/or implemented to efficiently identify or surface images and/or colors related to color palettes within any user interface, page, video, electronic book and/or other electronic content. In addition, aspects of the present disclosure, in some embodiments, may be used by consumers, merchandisers, designers, architects, artists, landscapers, developers, gamers, students, etc. for virtually any purpose. Without limitation, aspects of the present disclosure may be used for identifying images and/or colors related to color palettes in social networking contexts, digital photo albums, digital news articles, and/or visual bookmarking contexts. For illustrative purposes, item images are often described below in the context of items listed in an electronic catalog. Alternatively, in other embodiments, item images that may be presented according to the systems and methods described herein may include advertisements, images in news articles, editorial content, videos, classified listings, auction listings and/or any other content that may be electronically presented to a user.

Overview of an Example Embodiment of Color Palette Services

FIG. 1 illustrates an embodiment of an operating environment 100 that can implement the features described herein in the context of an example recommendation service 102. In some embodiments, the operating environment 100 includes the recommendation service 102, an image processing service 104, an affiliated color service 105, a commerce service 106, a palette data store 110, a dictionary data store 112, a network 120, an item data store 130, third party users 140, and color palette providers 150. In some embodiments, various components of the operating environment 100 are communicatively interconnected with one another via the network 120. The operating environment 100 may include different components, a greater or fewer number of components, and can be structured differently. For example, there can be more than one data store or other computing devices in connection with the recommendation service 102. As another example, components of the operating environment 100 may communicate with one another with or without the network 120.

The image processing service 104 can correspond to any system capable of performing the associated processes described herein. The image processing service 104 may be implemented by one or more computing devices. For example, the image processing service 104 may be implemented by computing devices that include one or more processors to execute one or more instructions, memory, and communication devices to transmit and receive data over the network 120. In some embodiments, the image processing service 104 is implemented on one or more backend servers capable of communicating over a network. In other embodiments, the image processing service 104 is implemented by one or more virtual machines in a hosted computing environment (e.g., a "cloud" computing environment). The hosted computing environment may include one or more provisioned and released computing resources, which computing resources may include computing, networking or storage devices.

In one aspect, the image processing service 104 can correspond to one or more applications that perform, individually or in combination, the image processing functions described herein, including image pre-processing, color matching, color thresholding, color palette determination, etc. In another aspect, the image processing service 104 may be configured to store or update palettes at the palette data store 110. In some embodiments, the image processing service 104 is associated with a network or network-based merchandise provider, vendor, or other parties. The image processing service 104 may access and process images from the item data store 130, provided by merchandisers for posting on a commerce network site on a network page that consumers can use to purchase the item, provided by consumers, provided by third party image data stores, or provided by other image sources. The image processing service 104 is communicatively connected to the palette data store 110.

The affiliated color service 105 can correspond to any system capable of performing the associated processes described herein. The affiliated color service 105 may be implemented by one or more computing devices. For example, the affiliated color service 105 may be implemented by computing devices that include one or more processors to execute one or more instructions, memory, and communication devices to transmit and receive data over the network 120. In some embodiments, the affiliated color service 105 is implemented on one or more backend servers capable of communicating over a network. In certain embodiments, the affiliated color service 105 is implemented by one or more virtual machines in a hosted computing environment.

In some aspects, the affiliated color service 105 can correspond to one or more applications that perform, individually or in combination, the functions described herein, including determining affiliated colors, assigning weights to affiliated colors, normalizing weights of affiliated colors, clustering or combining colors based on color distances, determining color similarity thresholds, updating affiliated colors based at least in part on updated palettes, etc. In certain aspects, the affiliated color service 105 may be configured to store or update palettes at the palette data store 110, and thus may be communicatively connected to the palette data store 110. In some embodiments, the affiliated color service 105 is associated with a network or network-based merchandise provider, vendor and/or other parties.

The recommendation service 102 can correspond to any system capable of performing the associated processes described herein. The recommendation service 102 may be implemented by one or more computing devices. For example, the recommendation service 102 may be implemented by computing devices that include one or more processors to execute one or more instructions, memory, and communication devices to transmit and receive data over the network 120. In some embodiments, the recommendation service 102 is implemented on one or more backend servers capable of communicating over a network. In other embodiments, the recommendation service 102 is implemented by one or more virtual machines in a hosted computing environment.

In one aspect, the color recommendation service 102 can correspond to one or more applications that perform, individually or in combination, the recommendation functions described herein, including recommending an image, recommending an item of a specified color, recommending items that coordinate with a user specified color, recommending sets of color coordinated items, recommending items of selected colors based on user textual and/or image-based search queries, etc. Recommendations of such images and/or items may correspond to matching or affiliated colors, palettes and/or items as will be further described herein. Recommendations may include item category recommendations, brand-related recommendations, price-related recommendations, etc. In another aspect, the recommendation service 102 may be configured to identify trends in items and utilize such trends to provide recommendations. In some embodiments, the recommendation service 102 is associated with a network or network-based merchandise provider, vendor and/or other parties.

The recommendation service 102 may be communicatively connected to the palette data store 110 and the dictionary data store 112. The palette data store 110 can generally include any repository, database, or information storage system that can store palette data and associated metadata. The dictionary data store 112 can generally include any repository, database, or information storage system that can store dictionaries, such as dictionaries that may be used to parse queries, identify keywords, identify colors, identify color palettes, or determine coordinating items, as discussed elsewhere herein.

The palette data stored in the palette data store 110 can be collections of colors optionally with associated name(s), weight(s) and date(s) of creation. Palette data can be of various formats, such as lists, vectors, arrays, matrices, etc. Metadata may optionally be associated with individual palettes for purposes of textually indicating the color(s) included in the palette using color name(s) or other identifier(s), and optionally indicating their format, semantics, features, conditions, sources, date of creation/editing, associated demographics (e.g., geographical region, age, gender, ethnic group, etc. of users that provided input used in creating the palette), or the like. An example process of generating color palettes is discussed in greater detail herein.

Using an initial color or colors, an ordered list of affiliated colors can be generated where a given affiliated color is ranked based at least in part on the popularity of the combination of the initial color or colors with that affiliated color. The color palette can be built by adding an affiliated color to the colors in the palette and then updating the list of affiliated colors to suggest new affiliated colors to add to the updated palette. The resulting color palette can be configured to contain a combination of colors that is visually appealing or preferable because each affiliated color used in generating the color palette has been determined by the community of people to be an appropriate or preferable color companion to the color or colors already in the palette. The palettes generated using the affiliated color process may be used to provide color-related recommendations for colors or colored items that would go well with another color or colored item. Particular color palettes may be associated with a particular community that includes a biased population (e.g., that are related based on geographical region, age, gender, ethnic group, religion, culture, language, dialect, preferences, social network, etc.). This enables providing recommended colors to users that have a known and/or inferred bias that corresponds to a palette of a community associated with such color palette bias.

In some embodiments, a first color can be selected by a program or a user and a plurality of palettes can be identified from a data store of palettes that contain that color (or a sufficiently similar color). From those palettes, a list of affiliated colors can be generated by identifying the other colors in the palettes. For each affiliated color in the list, a weight can be assigned based on the ranking, rating, and/or number of votes the containing palette has received. The list of affiliated colors can be sorted based on the assigned weights. The program or user can select an affiliated color from the sorted list to add to a custom color palette containing the initial color. When the selected affiliated color is added to the palette, a new list of affiliated colors can be generated based at least in part on the colors in the palette that allows the program or user to continue to build the color palette. For more example details on extracting colors from an image to obtain a color palette, see U.S. patent application Ser. No. 14/316,483, entitled "IMAGE-BASED COLOR PALETTE GENERATION," filed on Jun. 26, 2014, which is incorporated by reference herein in its entirety. For more example details on identifying affiliated colors and/or building an affiliated color palette based at least in part on an input color or palette, such as an input color or palette identified from a reference image, see U.S. patent application Ser. No. 14/315,700, entitled "FAST COLOR SEARCHING," filed on Jun. 26, 2014, which is incorporated by reference herein in its entirety.

The commerce service 106 may provide an electronic catalog to which third party users 140 may be provided access via respective user devices. For example, the commerce service 106 may provide item detail pages. A given item detail page may include detailed information regarding an item (e.g., an item being offered for sale), such as one or more images, descriptive text, color name(s), a price, weight, size options, reviews of the item by other users or by professional reviewers, alternative similar items, and/or other information. The item detail page may also include controls that the user can use to select among various versions of the item (e.g., size, color, etc.), and a purchase control that the user can use to initiate purchase of the item (e.g., by adding the item to a shopping cart). The commerce service 106 may also provide third party users 140 with interfaces that the user can use to request recommendations and submit queries, such as color-related recommendations and search queries.

The network 120 may include any suitable combination of networking hardware and protocols necessary to establish communications within the operating environment 100. For example, the network 120 may include private networks such as local area networks (LANs) or wide area networks (WANs) as well as public or private wireless networks, satellite networks, cable networks, cellular networks, or the Internet. In such an embodiment, the network 120 may include hardware (e.g., modems, routers, switches, load balancers, proxy servers, etc.) and software (e.g., protocol stacks, accounting software, firewall/security software, etc.) that establishes networking links within the color recommendation processing environment 100. Additionally, the network 120 may implement one of various communication protocols for transmitting data between components of the operating environment 100.

The item data store 130 may be associated with one or more network sites and systems, such as a commerce network site providing the commerce service 106 and the recommendation service 102, and/or third party merchandise providers or vendors that may market items via the commerce service 106. The item data store 130 may be associated with any computing device(s) that can facilitate communication with the recommendation service 102 via the network 120. Such computing devices can generally include servers, desktops, laptops, wireless mobile devices (e.g., smart phones, PDAs, tablets, wearable computing devices, or the like), game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

The item data store 130 may have metadata/keywords that identify and/or describe the respective items. By way of example, the item data store 130 may store item records for respective items in one or more electronic catalogs including unique item identifiers, such as Universal Product Codes (UPC), European Article Numbers (EAN), International Standard Book Numbers (ISBN), and/or other identifiers. By way of further example, the item metadata may indicate the item type and/or category, such as "dress" and "clothing," or "blender" and "kitchen appliance." In addition, the item metadata may include text or another color identifier (sometimes referred to herein as a "color name") identifying one or more colors of the item or of versions of the item, such as "red," "orange," "blue," etc. The metadata may further include such information as brand. Other data, such as price, may be included as metadata or otherwise made accessible. Still further, a given item record may include one or more images of the item, where the image may be associated with metadata (e.g., identifying items in the image by item type, item category, unique identifier, identifying associated color palettes, etc.). Certain keywords may not identify a color explicitly, but may be suggestive of a color (e.g., "summery," "formal," "wintery," etc.). Item record data may have been provided by an operator of a commerce or other network site, by consumers, merchandisers, vendors, third party data stores, artists, designers, color providers, and/or other sources. As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

Third party users 140 may correspond to visitors to a network site (e.g., a commerce network site providing commerce service 106), such as consumers, designers, architects, or the like, and can be associated with any computing device(s) that can facilitate communication with the recommendation service 102 via the network 120. Such computing devices can generally include wireless mobile devices (e.g., smart phones, PDAs, tablets, wearable computing devices, or the like), desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

The color palette providers 150 can create and/or curate color combinations based on the preferences of each provider's community of users. Particular color palette providers 150 may be associated with a particular community that includes a biased population or a population with unique or particular preferences. This may allow for the affiliated color service 105 to retrieve palettes with a known and/or desired bias depending at least in part on the use of the retrieved palettes. This may also allow for the affiliated color service 105 to reduce or remove the bias present in different communities by combining palettes from a plurality of communities of users.

The color palette providers 150 can be associated with any computing device(s) that can facilitate communication with the affiliated color service 105 via the network 120. Such computing devices can generally include network servers, desktops, laptops, wireless mobile devices (e.g., smart phones, PDAs, tablets, wearable computing devices, or the like), game platforms or consoles, electronic book readers, television set-top boxes, televisions (e.g., internet TVs), and computerized appliances, to name a few. Further, such computing devices can implement any type of software (such as a network server) that can facilitate the communications described above.

One skilled in the relevant art will appreciate that the components and configurations provided in FIG. 1 are illustrative in nature. Accordingly, additional or alternative components and/or configurations, especially regarding the additional components, systems and subsystems for facilitating functions disclosed herein may be utilized.

Figure 2:
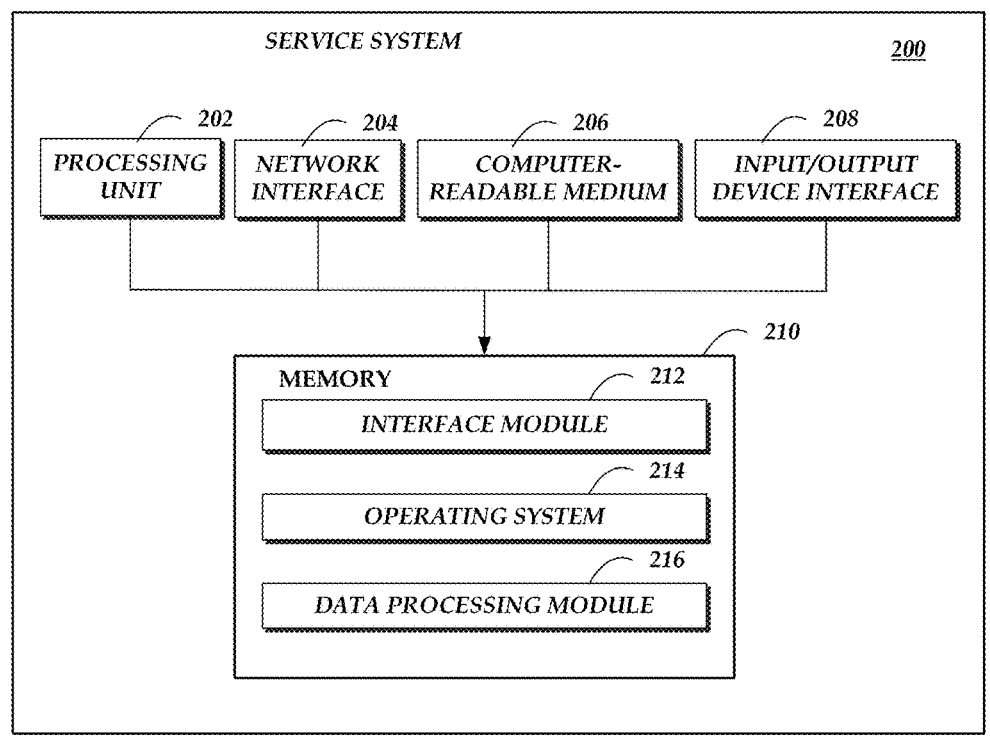
FIG. 2 is a block diagram illustrating an embodiment of example components of a computing system utilized in accordance with the operating environment of FIG. 1.

FIG. 2 is a block diagram illustrating an embodiment of example components of a computing system 200 implementing at least one of a recommendation service 102, an image processing service 104, an affiliated color service 105, or a commerce service 106, utilized in accordance with the operating environment 100 of FIG. 1. The example computing system 200 includes an arrangement of computer hardware and software components that may be used to implement aspects of the present disclosure. Those skilled in the art will appreciate that the example components may include more (or fewer) components than those depicted in FIG. 2. It is not necessary, however, that all of these generally conventional components be shown in order to provide an enabling disclosure.

The computing system 200 may include a processing unit 202, a network interface 204, a non-transitory computer-readable medium 206, and an input/output device interface 208, that all may communicate with one another by way of a communication bus. The network interface 204 may provide the recommendation service 102, the image processing service 104, the affiliated color service 105, and/or the commerce service 106 with connectivity to one or more networks or computing systems. The processing unit 202 may thus receive information and instructions from other computing devices, systems, or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more embodiments of the present disclosure. The memory 210 generally includes RAM, ROM and/or other persistent or non-transitory computer-readable storage media. The memory 210 may store an operating system 214 that provides computer program instructions for use by the processing unit 202 in the general administration and operation of the recommendation service 102, the image processing service 104, the affiliated color service 105, and/or the commerce service 106. The memory 210 may further include other information for implementing aspects of the present disclosure.

In an example embodiment, the memory 210 includes an interface module 212. The interface module 212 can be configured to facilitate generating one or more user interfaces through which an item data store 130 or a third party user 140, utilizing a compatible computing device, may send to, or receive from, the recommendation service 102 recommendations, image data, palette data, instruction data, metadata, etc., or otherwise communicate with the recommendation service 102. Specifically, the interface module 212 can be configured to facilitate processing functions described herein, including recommending an image, recommending an item, recommending a keyword, recommending items that coordinate with a user specified item, recommend an assemblage of coordinating items (e.g., clothing, furniture, appliances, housewares, linen, etc.) in coordinating colors, recommending items of selected colors based on user textual search queries, validating metadata, processing purchase transactions, etc. Recommendations of such images, items, and/or palettes may correspond to matching or affiliated colors, palettes and/or items as will be further described herein.

For example, a third party user 140 may submit a color-related recommendation query or selection and the item data store 130 may provide data used to satisfy the query or selection, including item images, item colors, item categories, item descriptions, item prices, etc. The third party user may submit queries or selections and receive recommendations via one or more generated user interfaces. The user interface can be implemented as a graphical user interface (GUI), Web-based user interface, computer program, smartphone or tablet program or application, touchscreen, wearable computing device interface, command line interface, gesture, voice, or text interface, etc., or any combination thereof.

In addition, the memory 210 may include a data processing module 216 that may be executed by the processing unit 202. In an example embodiment, the data processing module 216 implements aspects of the present disclosure. For example, the data processing module 216 can be configured to process user queries, instructions, data from the item data store 130, palette data from the palette data store 110, or metadata to generate image-based recommendations.

It should be noted that the computing system 200 may include some or all of the components present in the computing system 200 as discussed herein with respect to FIG. 2. In addition, the computing system 200 may include additional components not present in FIG. 2. The modules or components described above may also include additional modules or be implemented by computing devices that may not be depicted in FIG. 1 or 2. For example, although the interface module 212 and the data processing module 216 are identified in FIG. 2 as single modules, one skilled in the relevant art will appreciate that each of the modules may be implemented by two or more modules and in a distributed manner. As another example, the computing system 200 and its components can be implemented by network servers, application servers, database servers, combinations of the same, or the like, configured to facilitate data transmission to and from item data store 130, third party users 140, or other image sources, via network 120. Accordingly, the depictions of the modules are illustrative in nature.

Several example routines will now be described with reference to the figures. It is understood that more than one of the routines or portions thereof may be utilized to generate recommendations, keywords, or color palettes in response to a given user query, selection, or other input.

Figure 3:
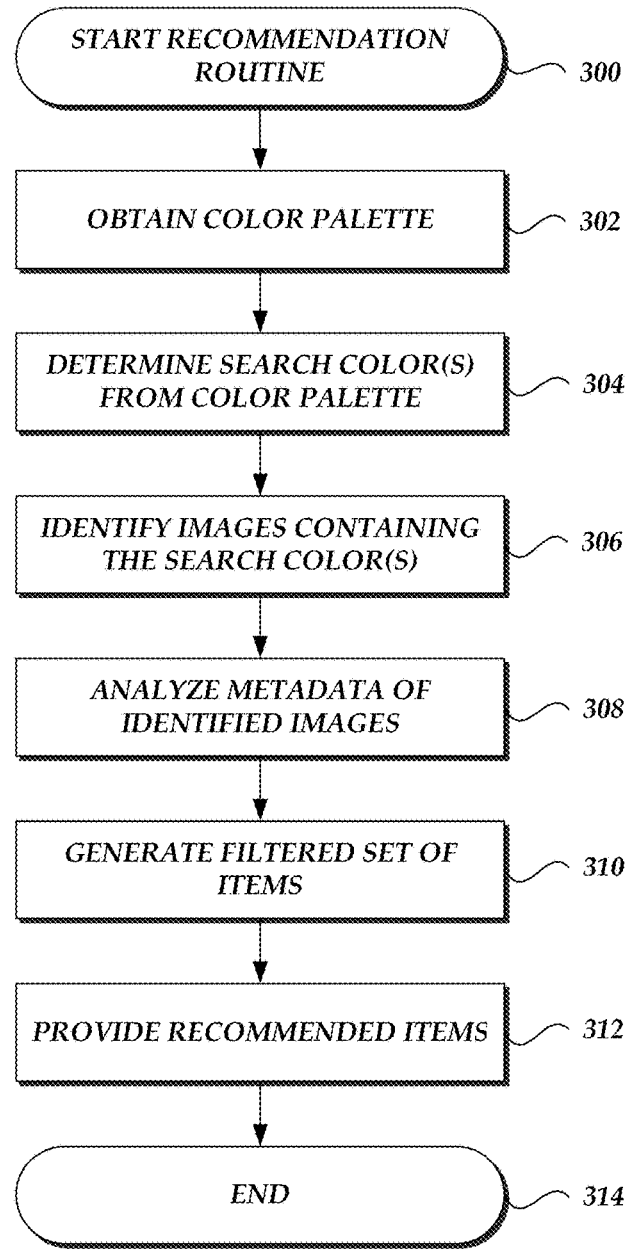
FIG. 3 is a flow diagram illustrating an embodiment of a routine implemented by the recommendation service for providing recommendations based at least in part on a color palette.

Example Process to Generate a List of Images Associated with an Input Color Palette FIG. 3 is a flow diagram illustrating an embodiment of a routine implemented by the recommendation service 102 for providing recommendations based at least in part on a color palette. The recommendation service 102 begins the routine at block 300. At block 302, the recommendation service 102 obtains a color palette. The color palette can be received from a user (e.g., a third party user 140 via data transmission to the recommendation service 102), from another system, retrieved from a data store (e.g., palette data store 110), or generated randomly. In some embodiments, the color palette can be extracted from an image, such as an image provided by a user or an image of an item in an item catalog or on a network site. Various systems and methods for extracting colors from an image are described in U.S. patent application Ser. No. 14/316,483, entitled "IMAGE-BASED COLOR PALETTE GENERATION," filed on Jun. 26, 2014, which is incorporated by reference herein in its entirety. In some embodiments, the color palette can be identified using a color palette name and/or other color identifier(s). The color palette can be a single color or a plurality of colors. The color palette can be represented using any conventional color representation including, for example, RGB values, YUV values, color names, or the like.

In some embodiments, the color palette is received as a text query (where the text query may comprise user-entered text or a selection of text by the user from a menu or otherwise, and the query includes a color name). The text query may include information in addition to color, such as item type (e.g., dress, blender, couch, or other specific item type), item category (e.g., clothing, appliance, furniture, etc.), color name (e.g., red, blue, orange, etc.), and/or color palette name (e.g., a color palette name as used by the color palette providers 150 or as stored in the palette data store 110). The query may also include other terms or filters (e.g., entered as text, selected from a menu, or otherwise provided), such as a price range, desired brands, etc., where the user is looking for recommendations of items corresponding to such terms or filters.

At block 304, the recommendation service 102 determines one or more search colors from the color palette obtained at block 302. In some embodiments, the color palette can include a plurality of colors represented in a color space. For example, the color palette can included colors extracted from an image, where the extracted colors are represented in the color space. As another example, the color palette can be obtained as a vector, array, or matrix of color values in the color space. In some embodiments, the recommendation service 102 may parse a text query to identify color names and translate those color names into color values or representations of color in the color space. As used herein, a color space includes any system that allows color to be represented using numeric values including, for example and without limitation, CIE, RGB, YUV, HSL/HSV, CMYK, and the like. For example, if the query is "red dress," the recommendation service 102 may use a dictionary, such as dictionary data store 112, to determine that the term "red" is a color and that the term "dress" is an item type. The recommendation service 102 may then determine what color or range of colors in the color space corresponds to the term "red."

For color comparisons, the recommendation service 102 may determine a range of colors that it will consider sufficiently similar to a search color derived from the obtained color palette. The range of colors can be determined using a color distance threshold applied in a particular color space. For example, the recommendation service 102 may apply a color distance threshold according to a color distance formula(e). An example of such a formula is based on a human perceptible color difference. For more information on how to determine a human perceptible color difference and the human color distance formula, please see U.S. patent application Ser. No. 14/316,483, entitled "IMAGE-BASED COLOR PALETTE GENERATION," filed on Jun. 26, 2014, which is incorporated by reference herein in its entirety. In some embodiments, the threshold used to determine sufficiently similar colors can be altered, tuned, or modified by a user or other system to broaden or narrow the search or recommendation results.

At block 306, the recommendation service 102 identifies images that contain one or more of the search colors determined at block 304. The recommendation service 102 can retrieve or receive color images for analysis. A color image can depict one or more items (e.g., clothing, furniture, appliances, etc.), a design, a scene, a landscape, or any other content of color. The recommendation service 102 can obtain a color image by retrieving or receiving image data from the item data store 130, third party users 140 (e.g., consumers or merchandisers seeking to sell items), or other image sources, via transmission of image data to the recommendation service 102.

The recommendation service 102 can analyze the color images to extract colors from the image. For an example of extracting colors from an image to obtain a color palette, see U.S. patent application Ser. No. 14/316,483, entitled "IMAGE-BASED COLOR PALETTE GENERATION," filed on Jun. 26, 2014, which is incorporated by reference herein in its entirety. The recommendation service 102 may use fast color searching techniques, as described in U.S. patent application Ser. No. 14/315,700, entitled "FAST COLOR SEARCHING," filed on Jun. 26, 2014, which is incorporated by reference herein in its entirety, to compare the search color(s) to the extracted colors. In some embodiments, the recommendation service 102 can use a color threshold such that any color within the color threshold is considered to be a match to the search color.

The recommendation service 102 can compare the search color to the colors extracted from a color image. If one or more of the extracted colors matches or corresponds to the search color, the color image is identified as an image that contains the search color. Colors can be considered to match or correspond where the colors are sufficiently similar, such as where the colors are less than a threshold distance apart in a color space. In certain embodiments, the recommendation service 102 can identify an image as containing the search color where the image contains at least one color that matches the search color. In some embodiments, the recommendation service 102 can identify an image as containing the search color where the matching color in the image comprises at least a minimum percentage of the image. This may be advantageous to avoid identifying an image as containing the search color if that color appears in a small number of pixels in the image. Where the search color comprises a plurality of search colors, the recommendation service 102 can identify an image as containing the search colors where it includes all of the search colors, where it includes a majority of the search colors, or where it includes at least one of the search colors.

The recommendation service 102 can rank or order the identified images based at least in part on the quality of the color matching. For example, where the search color matches a large portion of the image, the image can be ranked relatively high. As another example, where the search color matches a distinct color in the image, the image can be ranked relatively high. Where there is a plurality of search colors, an image can be ranked relatively high if it contains a large fraction of the search colors.

At block 308, the recommendation service 102 analyzes metadata associated with the images identified at block 306. The recommendation service 102 may access the item data store 130, which may correspond to an electronic catalog of items, to extract metadata corresponding to the identified images. For example, item records in the item data store 130 may have tags or other metadata/keywords that identify describe the respective items. The item data store 130 may store item records for respective items in one or more electronic catalogs including item identifiers. By way of further example, the item metadata may include item identifier(s) that indicate the item type and/or category, such as "dress" and "clothing," or "blender" and "kitchen appliance." In addition, the item metadata may include text or other metadata identifying one or more colors of the item or of versions of the item, such as the color names "red," "orange," "blue," etc. The item metadata may include keywords, such as non-color specific keywords, associated with the item and/or colors included in the item. The metadata may further include such information as brand. Other data, such as price, may be included as metadata or otherwise accessed. Item record data may have been provided by an operator of a commerce site, by consumers, third party data stores, and/or other sources.

The recommendation service 102 may compare information obtained from the text query with item metadata or other data to identify items that correspond to the query. The recommendation service 102 may store a temporary record of the matching items (e.g., by storing a list of corresponding item identifiers). The recommendation service 102 may rank the matching items in accordance with the closeness of the match to the query to provide an item relevancy ranking. For example, item identifiers in the text query can be used to rank matching items based at least in part on a comparison between the item identifiers and information in the item metadata. In some embodiments, user profile information and/or demographics may be used to rank matching items. For example, a user's age, gender, geographical location, job, marital status, or the like can be used to determine recommended items from the grouping of matching items. In some embodiments, a user's preferences may be used in ranking matching items. By way of example, the user's preferences may be determined based on the user's purchase or browse history (which may indicate the colors of items purchased or browsed by the user), items is a user's wish list, prior user color-related search queries, or preferences explicitly provided by the user via a preference form or otherwise.

At block 310, the recommendation service 102 generates a filtered set of items based at least in part on the quality of color matching between the obtained color palette and the colors in the image and the image metadata. In some embodiments, the recommendation service 102 utilizes the text query to further filter out items that do not sufficiently match the information in the query. For example, if the text query specifies "blue couch," a blue shirt will be excluded from the set of items. Optionally, the recommendation service 102 may rank the filtered list according to the ranking of matching items performed at block 306. Optionally, the color recommendation service 102 may rank the filtered list according to the ranking of closeness of the item color to the color query. Optionally, some combination of the ranking of matching items performed at block 306 and a ranking based on the closeness of the item color to the color query may be used to generate a further relevancy ranking of items.

The identified images may be ranked in accordance with a determination as to how closely a given image corresponds to the search colors. For example, palettes may have an assigned weight indicating which is the most dominant color (where a color may or may not be a shade of a color), the second most dominant color, and so on. Optionally, only images that match within a percentage of the search colors, or only a specified maximum number of images will be identified (e.g., the 10 closest images). Other factors may be taken into account in weighting images. For example, attitudes and perceptions of colors, and what colors coordinate with what colors, may change over time, based on gender, geographic region, ethnic group, age, culture, religion, etc. Thus, the image weighting may be based at least in part on one or more of the image date, and optionally on one or more of the user's gender, geographic region, ethnic group, age, culture, religion, palette popularity trends, etc.

At block 312, the recommendation service 102 provides the recommended items and/or images. The items and/or images can be provided for display on a user device (e.g., via a browser installed on the user device, via a dedicated application such as a mobile device app, or otherwise) as recommended items based at least in part on the color palette (e.g., which may include a user's query). The recommended items may be in the form of only images of the matching items, where the images may be retrieved from the item data store 130. The recommended items may be in the form of only text identifying and/or describing the matching items, where the text may be retrieved from the item data store 130. The recommended items may be in the form of both images of the matching items and corresponding text retrieved from the item data store 130. Optionally, controls may be provided to the user that the user can use to indicate that a larger or a smaller number of matching items are to be presented. In response, the recommendation service 102 may accordingly modify the number of items presented to the user. For example, if the user indicates that fewer items are to be presented to the user, the recommendation service 102 may present the higher ranked items and not present a number of lower ranked items that had previously been presented. In some embodiments, the recommendation service 102 is configured to generate a user interface, wherein the user interface is configured to display one or more of the matching images, the image metadata for the matching images, or a combination of both matching images and associated metadata.

Optionally, the recommendation service 102 may utilize metadata associated with an item selected by the user to identify similar and/or coordinating items to the user. For example, the recommendation service 102 may utilize color information associated with the selected item (e.g., associated with the image of the selected item), the item type information, and/or the item categorization information to identify related and/or coordinating items. For example, if the user selected a dress having a palette with a deep shade of red as the primary color, the recommendation service 102 may identify and present items having a similar palette with deep red as a primary color and/or having a coordinating color palette (an affiliated color) different than the primary color of the item. By way of further example, the recommendation service 102 may identify item accessories (e.g., a scarf, earrings, handbag, etc.) whose color(s) coordinate with the selected dress. As another option, the recommendation service 102 may identify item accessories or coordinating items in response to a user query (e.g., where the user provides or selects an additional item type or item category query). In some embodiments, the recommendation service 102 can identify similar and/or coordinating items by accessing information from the item data store 130, wherein information for an item in the item data store 130 includes one or more similar and/or coordinating items. In some embodiments, the recommendation service 102 can identify similar and/or coordinating items by accessing information about an item identifier in the dictionary data store 112, wherein the information for the item identifier (e.g., dress) includes a list of different item identifiers that are similar or that coordinate with an item described by the item identifier. The recommendation service 102 ends the routine at block 320.

By way of example, a merchandiser may want to design a collection of items that are based on a color palette. The merchandiser can provide an input image with a desired color palette, color values in the color palette, the name of the color palette and/or names for the colors in the color palette and receive a list of items that contain the colors in that palette. The merchandiser may be able to provide item identifiers to the recommendation service 102 to rank and/or filter the returned list of items. This can allow the merchandiser to search and find recommendations based on color names as well as other information in a query.

By way of further example, a user may want to build an outfit based on the color blue. The user may submit a query "blue outfit." The recommendation service 102 may parse the query and determine that "blue" is a color and "outfit" is an assemblage of clothing items, optionally including accessories. Based on the queried color, routine depicted in FIG. 3 can determine, from the palette data store 110, a color palette (e.g., a group of one or more colors that correspond to the color in the query). The recommendation service 102 may then identify clothing items having the color palette, and assemble one or more outfits accordingly. Items in a given assembled outfit may be presented to the user as a set to indicate that the items in the set are part of the same recommended outfit.

Example Process to Validate a Color or Palette Name with Image Metadata

Figure 4:
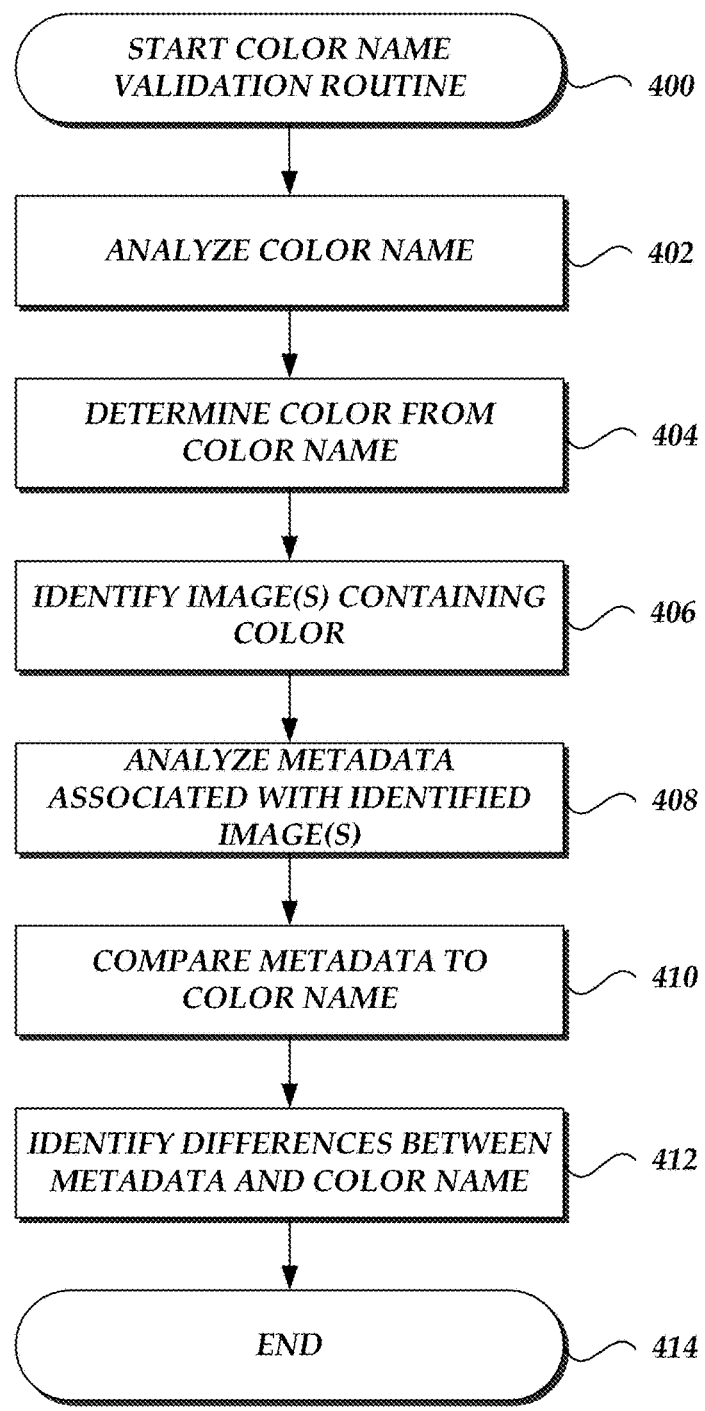
FIG. 4 is a flow diagram illustrating an embodiment of a routine implemented by the image processing service for validating color names in image metadata based at least in part on input color names.

FIG. 4 is a flow diagram illustrating an embodiment of a routine implemented by the image processing service 104 for validating color names and/or information in image metadata based at least in part on input color names. A merchandiser (or other vendor or party) may submit an image, such as a photograph, of an item for posting on an item detail page of a commerce site that consumers may use to purchase the item. Typically, the image will be associated with metadata provided by the merchandiser, including one or more color names identifying the item (or items) in the image. However, not infrequently, the color name submitted by the merchandiser (or other source) is in error and does not match the color of the item in the image. For example, an image of a blue dress may be submitted with a color name of "purple." Having erroneous color names results in inaccurate image records and can result in incomplete or inaccurate recommendations. Thus, for example, if a search is performed for a blue dress (e.g., in response to a user query and/or as part of a recommendation process), the blue dress mistakenly tagged with the color name "purple" may not be identified in the search or to the user. Conversely, if a search is performed for a purple dress, the blue dress mistakenly tagged with the color name "purple" will be erroneously identified in the search and to the user as part of a recommendation. In some embodiments, a user interface may be generated to present color validation information, color names, erroneous information, comparison data, metadata associated with images, and/or images to a user.

Certain embodiments address the foregoing challenges by determining when certain image metadata, such as a color or color palette name, does not match the color palette of an item in the image. As will be discussed in greater detail below, the image processing service 104 analyzes an input color name or names; determines one or more colors from the color name(s); identifies one or more images with the determined colors; accesses metadata associated with the identified image(s), the metadata including names of colors in the image; compares the information in the metadata with the color names; and identifies differences between the input color name(s) and the color names in the metadata. If the color names from the metadata do not match or correspond to those determined from the input color name(s), the image processing service 104 can edit the metadata to include the color names and/or alert an entity (such as an operator and/or the entity that provided the image) via a notification regarding the mismatch. In response to the mismatch notification, the entity that provided the image can manually compare the color names from the image metadata that do not match those color names, enabling the entity to determine which color name is correct. The entity can then select the appropriate color name to be stored as metadata with the image, update the definition of the color name, or add the color name to a repository of color names (e.g., the palette data store 110). Thus, searches and recommendations related to the item will be more accurate and complete. In some embodiments, the image processing service 104 identifies and/or receives image(s); determines validation color name(s) based at least in part on color(s) from the image(s); accesses metadata associated with the image(s), the metadata including names of colors in the image; and identifies differences between the validation color name(s) and the color names in the metadata. For example, the image processing service 104 may automatically process images from the item data store 130 to validate metadata associated with the images and/or notify an entity about discrepancies with the color information in the metadata. In some embodiments, the image processing service 104 may execute as a batch process to validate color information.

Similarly, if an image is provided that does not include a color name in its metadata, the image processing service 104 can process the image to extract one or more colors from the image, identify color names that correspond to the extracted colors, and edit the metadata to include the identified color names. This enables the item to be discovered in a search for the item type or category having the color as a search parameter. For example, the search may be performed in response to a user query (e.g., including a user provided or selected keyword and/or image) and/or as part of a recommendation process, as described elsewhere herein. Thus, searches and recommendations related to the item will be more accurate and complete.

The image processing service 104 begins the routine of FIG. 4 at block 400. At block 402, the image processing service 104 analyzes a color name, referred to as the reference color name. The reference color name can be received from a user (e.g., a third party user 140 via data transmission to the recommendation service 102), from another system, or generated randomly. In some embodiments, color names may be determined based at least in part on the colors retrieved or extracted from images, described in further detail below. Color names may be any type of color identifier, including names expressed using ASCII characters, icons, or other such data. Color names may be provided by one or more surveys such as a human survey of color names and/or human generated data of color names. For example, a human color survey may have included hundreds of thousands of users to name millions of RGB colors. Furthermore, the color names from a color survey may be associated with ranking and/or voting data indicating relative human preferences for color names. For example, out of thousands of survey participants, the color name "lime" may receive the highest votes for a particular RGB color value. The color names from a human color survey may be richer and/or more accurate than standard color naming data stores and/or data sources. For example, color names based on a color survey may include names that are not typical color names but that are highly suggestive of color, such as "lime," "asparagus," or the like. The data from such a survey may be stored in the palette data store 110. A service may use fast color searching techniques, as described in U.S. patent application Ser. No. 14/315,700, entitled "FAST COLOR SEARCHING," filed on Jun. 26, 2014, which is incorporated by reference herein in its entirety, to retrieve one or more names for colors. Additionally or alternatively, a color name associated with a color may be determined based at least in part on color ranges within a color space, as described in further detail herein.

In some embodiments, color names may be associated with metadata and/or additional data may be determined to be associated with color names. For example, a color with the name "manatee" may be associated with a text description such as "animal," "sea animal," "mammal," "exotic animal," or the like. In some embodiments, data associated with color names may be determined based at least in part on natural language processing or other techniques. As a result, validation of color names associated with an image may include filtering of color names based at least in part on metadata. For example, during color name validation, color names associated with animals and/or exotic animals may be excluded if used with images in a clothing context.

At block 404, the image processing service 104 determines a color from the color reference name, referred to as the reference color. Determining the reference color from the reference color name includes associating the reference color name (e.g., from a text-based query) with a color value or range of values in a color space. The image processing service 104 can search for the reference color name in the palette data store 110, the dictionary data store 112 and/or in another color name service such as the color palette providers 150. The reference color name can be associated with a single color, a range of colors, or a color palette (e.g., a group of one or more colors associated with a single name).

The reference color can be represented by a value or a range of values in a color space. In some embodiments, the image processing service 104 can determine a threshold color distance such that any color that has a distance less than the threshold from the reference color is considered to be sufficiently similar to the reference color. In certain embodiments, the threshold color distance is based at least in part on human perceptible color differences. This allows the image processing service 104 to determine relatively large or relatively small areas within the color space for matching colors with color names. This may be advantageous, for example, where the reference color name suggests a relatively broad range of colors (e.g., "red," "green," "yellow," etc.) or a relatively narrow range of colors (e.g., "bright cerulean," "periwinkle," "sunset orange," etc.).

At block 406, the image processing service 104 identifies images containing the reference color determined at block 404. The image processing service 104 can retrieve or receive color images for analysis. A color image can depict one or more items (e.g., clothing, furniture, appliances, etc.), a design, a scene, a landscape, or any other content of color. The image processing service 104 can obtain a color image by retrieving or receiving image data from the item data store 130, third party users 140 (e.g., consumers or merchandisers seeking to sell items), or other image sources, via transmission of image data to the image processing service 104.

The image processing service 104 can analyze the color images to extract colors from the image. For an example of extracting colors from an image to obtain a color palette, see U.S. patent application Ser. No. 14/316,483, entitled "IMAGE-BASED COLOR PALETTE GENERATION," filed on Jun. 26, 2014, which is incorporated by reference herein in its entirety. The image processing service 104 may use fast color searching techniques, as described in U.S. patent application Ser. No. 14/315,700, entitled "FAST COLOR SEARCHING," filed on Jun. 26, 2014, which is incorporated by reference herein in its entirety, to compare the reference color to the extracted colors. In some embodiments, the image processing service 104 can determine a color threshold such that any color within the color threshold is considered to be a match to the reference color.

The image processing service 104 can compare the reference color to the colors extracted from a color image. If one or more of the extracted colors matches the reference color, the color image is identified as an image that contains the reference color. Colors can be considered to match where the colors are sufficiently similar, such as where the colors are less than a threshold distance apart in a color space. In certain embodiments, the image processing service 104 can identify an image as containing the reference color where the image contains at least one color that matches the reference color. In some embodiments, the image processing service 104 can identify an image as containing the reference color where the matching color in the image comprises at least a minimum percentage of the image. This may be advantageous to avoid identifying an image as containing the reference color if that color appears in a small number of pixels in the image. Where the reference color is a color palette comprising a plurality of colors, the image processing service 104 can identify an image as containing the reference color where it includes all of the colors in the reference color palette, where it includes a majority of the colors in the reference color palette, or where it includes at least one color in the reference color palette.

At block 408, the image processing service 104 analyzes metadata associated with each image identified at block 406. The image processing service 104 retrieves or receives metadata from the item data store 130, for example. The metadata may include information corresponding to the color palette (e.g., color names), color scheme, lighting source, lighting direction, or other factors regarding the color rendering of the image. The metadata may also include information about the currently obtained color image, other color images, subjects or category of subjects depicted, sources contributing to the image, or their interrelations. The metadata can further include any other information associated with the color image as can be envisioned by a person of skill in the art.

The image processing service 104 analyzes the metadata to determine whether it contains one or more color names. The image processing service 104 can compare the information contained in the metadata with the dictionary data store 112, the palette data store 110 and/or other color name services to identify any color names in the metadata. The image processing service 104 can then compare any identified color names from the metadata with the colors extracted from the associated image to create a map of metadata color names to colors extracted from the color image. In some embodiments, where the metadata contains fewer color names than extracted colors, the image processing service 104 can order the extracted colors based on prominence in the image and match those prominent colors with the color names.

At block 410, the image processing service 104 compares any color names identified within the metadata to the reference color name to determine whether the metadata color name(s) match the reference color name. In some embodiments, matching of the reference color name to the color name(s) in the metadata may be based on partial text string matching, matching of strings and/or words, fuzzy matching, natural language processing, or the like and/or some combination thereof. If the image processing service 104 determines that the metadata associated with the image does not include color identification information, such as a color name, then the reference color name may be added to the metadata of the image (e.g., in item data store 130, a dedicated image data store, or elsewhere).

In some embodiments, the image processing service 104 can determine that color names match if the colors represented by the respective color names are sufficiently similar so as to be considered a match. Sufficient similarity can be based at least in part on color distances. For example, where the reference color name is "blue" and the metadata includes the color name "cobalt," the image processing service 104 can consider this a match because the color corresponding to the color name "cobalt" lies within a color distance threshold from the color corresponding to the color name "blue." In another example, the lighting conditions for an image may be such that the one or more colors extracted from the image may not match the color metadata associated with the image (even though the color metadata may be correct). Thus, similar to the above, the image processing service 104 may determine that the item's color metadata is correct because the color distance between the two colors may be within a threshold. In some embodiments, the color distance between the extracted color and the color corresponding to the metadata may be presented to a user for review.

At block 412, the image processing service 104 identifies differences between the color name and the name of the color in the metadata. If the image processing service 104 determines that the metadata color name matches the reference color name, the image processing service 104 completes the routine at block 414. If the image processing service 104 determines that the metadata color name does not sufficiently match the reference color name, then the reference color name may be added to the metadata of the image and optionally the metadata color name (or other identifier) is deleted or an indication is stored that the original color name is mismatched or incorrect. If the image processing service 104 determines that the metadata color name does not sufficiently match the reference color name, the image processing service 104 can suggest a modification of the metadata to be approved and/or executed by another system or user. If the image processing service 104 determines that the metadata color name does match any known color name and the associated color is sufficiently different from any color associated with known color names, the image processing service 104 can add the color name to the palette data store 110, the dictionary data store 112 and/or another color name service. In this way, the data store of color names can be updated to include new color names. The routine of FIG. 4 ends at block 414.

Example Process to Identify Keywords from a Color or Palette Name

Figure 5:
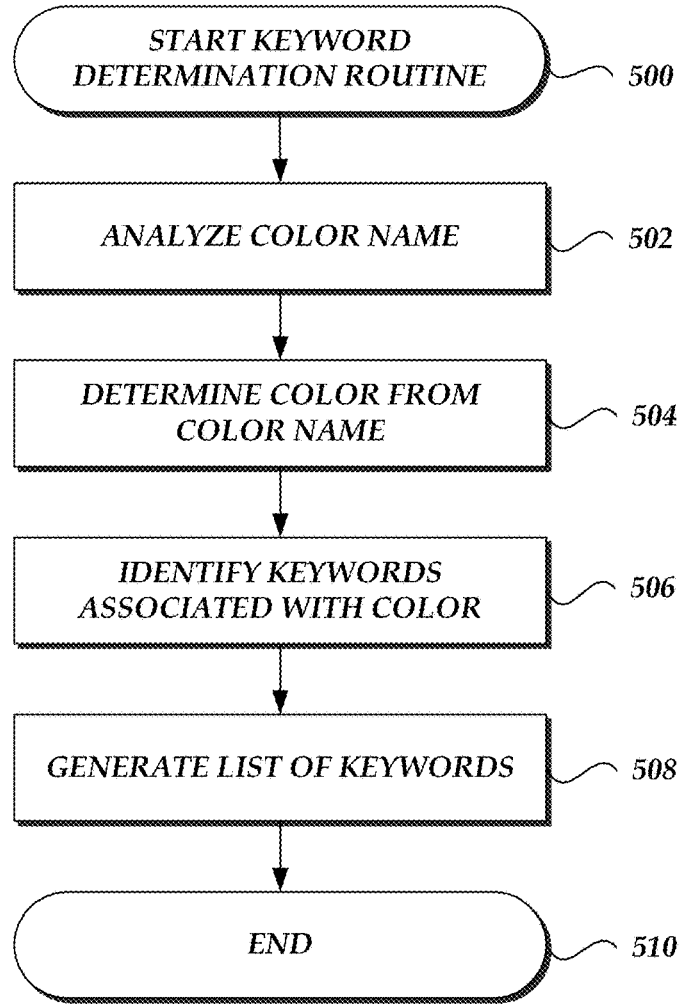
FIG. 5 is a flow diagram illustrating an embodiment of a routine implemented by the recommendation service for determining keywords based at least in part on a color palette determined from input color names.

FIG. 5 is a flow diagram illustrating an embodiment of a routine implemented by the recommendation service 102 for determining keywords based at least in part on input color names. The routine can be used to provide suggested keywords that are non-color specific (e.g., summery, warm, Christmas, etc.) based on one or more input color names. In this way, color names can be associated with non-color specific keywords that may allow a user, service, or system to identify items that contain a desired color, complementary colors and/or colors with a similar look or feel.

A user may want to search for items that have a particular look or feel, on a commerce network site for example, and may begin the search by identifying a color that the user associates with that look or feel. Searching for items with that color may result in items that contain the searched color, but the results may exclude other items that would satisfy the user because those items do not contain the searched color. For example, if the user searches for blue sweaters, the user may also be interested in grey sweaters because the user is searching for a "wintery" look. However, the search for blue sweaters typically will exclude grey sweaters.

A merchandiser (or other vendor) may be interested in providing a variety of keywords in the description of an item, for example using metadata associated with an image of the item. The merchandiser may be able to describe the colors of the item, but limiting the description to those colors may be too narrow. If the description is too narrow, users may not find the items provided by the merchandiser because they are using keywords that the merchandiser did not include in the item description. For example, the merchandiser may be selling a serving bowl that is red and orange, but a user searching for a "fiery" serving bowl may not find the merchandiser's item due to the search terms used.

Certain embodiments address the foregoing challenges by determining appropriate keywords from one or more input color names. As will be discussed in greater detail, the recommendation service 104 analyzes an input color name or names; determines one or more colors from the color name(s); identifies one or more keywords associated with the determined colors; and provides those keywords. In some embodiments, the recommendation service 102 can receive suggestions for keywords to associate with color names. In certain embodiments, the recommendation service 102 can associate keywords with additional colors if those colors sufficiently similar to colors already associated with the keywords.

With reference to FIG. 5, the recommendation service 102 begins the routine at block 500. At block 502, where the recommendation service 102 analyzes a color name, referred to as the reference color name. This is similar to block 402 in the routine depicted and described in greater detail herein with reference to FIG. 4. The reference color name can be received from a user (e.g., a third party user 140 via data transmission to the recommendation service 102), from another system, or generated randomly. As described herein, color names may be any type of color identifier and may be provided by one or more surveys such as a human survey of color names and/or human generated data of color names. The recommendation service 102 may use fast color searching techniques, as described in U.S. patent application Ser. No. 14/315,700, entitled "FAST COLOR SEARCHING," filed on Jun. 26, 2014, which is incorporated by reference herein in its entirety, to retrieve one or more names for colors. Additionally or alternatively, a color name associated with a color may be determined based at least in part on color ranges within a color space, as described in further detail herein. In some embodiments, color names may be associated with metadata and/or additional data may be determined to be associated with color names. In some embodiments, data associated with color names may be determined based at least in part on natural language processing or other techniques. As a result, color names associated with a keyword may include filtering of color names based at least in part on metadata. For example, color names associated with heat may be excluded from keywords that generally are associated with coldness.

At block 504, the recommendation service 102 determines a color from the color reference name, referred to as the reference color. This is similar to block 404 in the routine depicted and described in greater detail herein with reference to FIG. 4. Determining the reference color from the reference color name includes associating the reference color name with a color value or range of values in a color space. The recommendation service 102 can search for the reference color name in the palette data store 110, the dictionary data store 112 and/or in another color name service such as the color palette providers 150. The reference color name can be associated with a single color, a range of colors, or a color palette.

The reference color can be represented by a value or a range of values in a color space. In some embodiments, the recommendation service 102 can determine a threshold color distance such that any color that has a distance less than the threshold from the reference color is considered to be sufficiently similar to the reference color. In certain embodiments, the threshold color distance is based at least in part on human perceptible color differences. This allows the recommendation service 102 to determine relatively large or relatively small areas within the color space for matching colors with color names. This may be advantageous, for example, where the reference color name suggests a relatively broad range of colors (e.g., "red," "green," "yellow," etc.) or a relatively narrow range of colors (e.g., "bright cerulean," "periwinkle," "sunset orange," etc.).

At block 506, the recommendation service 102 identifies keywords associated with the reference color. A keyword can include non-color-specific words that may be suggestive of one or more colors (e.g., summery, sunny, mellow, dressy, holiday, Halloween, Christmas, Chanukah, sports team name, etc.). A keyword can include words that appear to be color-specific that are amenable to different meanings. For example, the word "blue" may refer to the color blue or the feeling of melancholy or depression. As another example, the word "orange" may refer to the color orange or the fruit of the same name. In such instances, the recommendation service 102 can be configured to disambiguate the potential meanings of the keywords. For example, where blue is used as a keyword, it may be interpreted as being associated with an emotion; and where it is used as a color name, it may be interpreted as the color. Keywords may also be combinations of color-specific and non-color-specific words. The keywords can be stored in the palette data store 110, the dictionary data store 112, the item data store 130, and/or with a keyword service. Each keyword can include one or more colors associated with that keyword. For example, a keyword may include metadata, the metadata including a list of colors or color names associated with the keyword. As another example, a data store can associate a keyword with one or more colors or color names in the data store. The colors can be represented using color names or as values in a color space. The colors associated with each keyword can also include ranges of colors and/or color palettes. By way of example, the keyword "Halloween" may be associated with orange and green palettes, which are typically associated with the Halloween holiday. By way of further example, a given sports team may be associated with palettes in the team's color. By way of yet further example, the keyword "formal" may be associated with palettes considered more formal, such as blacks, greys, dark blues, etc.

The recommendation service 102 uses the reference color to identify one or more keywords by comparing the reference color to the color(s) associated with the keywords. If the reference color is the same or sufficiently similar to one or more of the associated keyword colors, the recommendation service 102 identifies the keyword as corresponding to the reference color name. In some embodiments, the recommendation service 102 can use a color distance threshold when comparing colors such that colors are considered sufficiently similar when the distance between two colors in a color space is less than the color distance threshold. In certain embodiments, the color distance threshold is configurable to match colors that are relatively far apart or to match colors that are relatively close together in a color space.

In some embodiments, keywords are associated with one or more color names. The recommendation service 102 can determine a color for each color name associated with the keyword. The recommendation service 102 can then compare the reference color to the colors determined from the keyword color names, as described elsewhere herein. In some embodiments, keywords are associated with color palettes. The recommendation service 102 can determine each color in the color palette and then compare the reference color to the colors of the keyword color palette. The recommendation service 102 can identify the keyword as being associated with the reference color where the reference color matches at least one color in the associated color palette. In some embodiments, there can be a plurality of reference colors, such as with a color palette. In such embodiments, the recommendation service 102 can identify a keyword as being associated with the reference color when at least one color associated with the keyword matches at least one reference color. Where the keyword is associated with a plurality of colors, the recommendation service 102 can identify the keyword as being associated with the reference colors where all of the reference colors match a color in the keyword color palette, where a plurality of reference colors match colors in the keyword color palette, or where at least one reference color matches a color in the keyword color palette. Similarly, the recommendation service 102 can identify the keyword as being associated with the reference colors when each color in the keyword color palette matches a reference color, when a plurality of colors in the keyword color palette matches reference colors, or where at least one color in the keyword color palette matches a reference color.

At block 508, the recommendation service 102 generates a list or grouping of keywords associated with the reference color name. Where the recommendation service 102 determines that more than one keyword is associated with the reference color, the recommendation service 102 can order the keywords. In some embodiments, the order of the keywords can depend at least in part on a weight associated with the keywords. The keywords can be weighted based at least in part on frequency of use, community votes or ranks, popularity, or the like. The recommendation service 102 can order the keywords such that the highest weighted, most popular, and/or highest ranked keywords are listed first.

In some embodiments, the recommendation service 102 orders the keywords based on weights of the colors associated with the keywords. For example, colors associated with keywords can be weighted or otherwise ranked for that particular keyword. A keyword such as "beach" may include colors such as blues and browns (e.g., water and sand) that have a higher weight than colors such as yellows (e.g., sun, clothes, toys, etc.). The recommendation service 102 can rank a first keyword higher than a second keyword where the weight of the color matching the reference color is higher for the first keyword than for the second keyword.

In some embodiments, the recommendation service 102 orders the keywords based on weights of the reference colors used to identify associated keywords. Where there are multiple reference colors, each can have a weight assigned to it. The recommendation service can then weight and order the keywords based at least in part on the weights of these reference colors. For example, where a first keyword is associated with a color that matches a first reference color and a second keyword is associated with a color that matches a second reference color, the recommendation service 102 can order the first keyword before the second keyword if the first reference color has a higher weight than the second reference color. Where the keyword is associated with more than one reference color, the weights of those reference colors can be combined to determine the weight of the keyword.

At block 510, the color recommendation service 102 ends the routine.

Optionally, the ranked list of keywords is provided for display on a user device (e.g., via a browser installed on the user device, via a dedicated application such as a mobile device app, or otherwise) as recommended keywords based at least in part on a user's query containing one or more reference color names. In some embodiments, when a user uses a color name in a search, the list of keywords is automatically determined and the search results are provided based on the reference color name(s) and the list of automatically generated keywords. The provided list may be in the form of only keywords or as images of items that are associated with the identified keywords, where the images may be retrieved from the item data store 130. The provided list may be in the form of only text identifying and/or describing items matching the automatically generated keywords, where the text may be retrieved from the item data store 130. The provided list may be in the form of both images of the matching items and corresponding text retrieved from the item data store 130. As yet another option, controls may be provided to the user that the user can use to indicate that a larger or a smaller number of matching items are to be presented. In response, the recommendation service 102 may accordingly modify the number of items presented to the user. For example, if the user indicates that fewer items are to be presented to the user, the recommendation service 102 may present the higher ranked items and not present a number of lower ranked items that had previously been presented. In some embodiments, the recommendation service 102 is configured to generate a user interface, wherein the user interface is configured to display one or more of the keywords and/or the keyword colors.

Example Process to Generate a Custom Color Palette from Color Names

Figure 6:
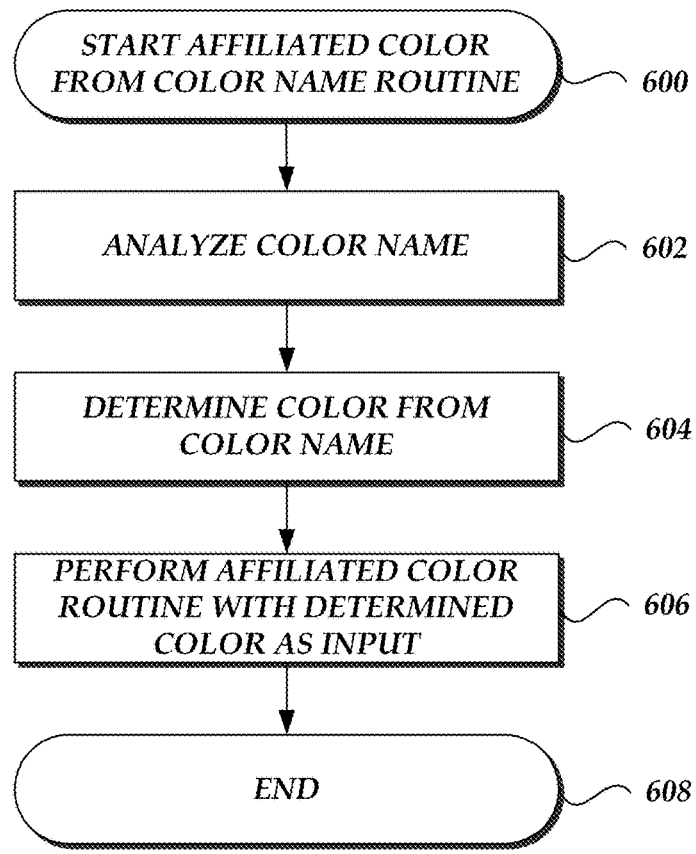
FIG. 6 is a flow diagram illustrating an embodiment of a routine implemented by the recommendation service for generating an affiliated color palette based at least in part on an input color name.

FIG. 6 is a flow diagram illustrating an embodiment of a routine implemented by the recommendation service 102 for generating a custom color palette based at least in part on a reference color name. A merchandiser (or other vendor) may be interested in identifying colors that complement or go well with a particular color or colors. The list of colors that go well with another color can be built by determining colors that are affiliated with the reference colors. Affiliated colors can include colors that are part of a group of colors that are ranked or rated by a community of users. Using the input of the community, curated color palettes can be provided and utilized to generate popular or appealing color palettes. Determining color palettes affiliated with the reference color can allow the merchandiser to provide or design items and/or collections of items that utilize a popular or appealing color palette.

The recommendation service 102 begins the routine at block 600. At block 602, the recommendation service 102 analyzes a color name, referred to as the reference color name. This is similar to block 402 in the routine depicted and described in greater detail herein with reference to FIG. 4. The reference color name can be received from a user (e.g., a third party user 140 via data transmission to the recommendation service 102), from another system, or generated randomly. As described herein, color names may be any type of color identifier and may be provided by one or more surveys such as a human survey of color names and/or human generated data of color names. The recommendation service 102 may use fast color searching techniques, as described in U.S. patent application Ser. No. 14/315,700, entitled "FAST COLOR SEARCHING," filed on Jun. 26, 2014, which is incorporated by reference herein in its entirety, to retrieve one or more names for colors. Additionally or alternatively, a color name associated with a color may be determined based at least in part on color ranges within a color space, as described in further detail herein. In some embodiments, color names may be associated with metadata and/or additional data may be determined to be associated with color names. In some embodiments, data associated with color names may be determined based at least in part on natural language processing or other techniques. As a result, color names associated with a keyword may include filtering of color names based at least in part on metadata. For example, color names associated with heat may be excluded from keywords that generally are associated with coldness.

The recommendation service 102 may obtain or determine a custom palette criterion for building the custom color palette. As described earlier, the criterion may represent a bias or preference in connection with a language, country, geographic region, ethnic group, social community, gender, age, time, trend, or the like. Alternatively or in addition, the criterion may correspond to an item, category of items, service, category of services, design, category of designs, or the like. The criterion can be obtained or determined based on an action of a user, metadata associated with a color image, metadata associated with a subject depicted by a color image, or any other information or actions related to the custom palette generation process. For example, the criterion can be derived, at least in part, from an attribute associated with the reference color name. As described earlier, illustratively, the color name is expressed in a particular language and/or in a particular context, or the color name is associated with other metadata. The particular language, context or other metadata may facilitate a determination of a color-related bias associated with a user or a category of items in which the user is interested.

In some embodiments, the recommendation service 102 determines one or more secondary color names that are related to the reference color name. The one or more secondary color names may facilitate color determination by expanding the basis for the determination. The secondary color name may be obtained based on groupings of similar or related color names via a natural language processing (NLP) model. At block 604, the recommendation service 102 determines a color from the color reference name, referred to as the reference color. This is similar to block 404 in the routine depicted and described in greater detail herein with reference to FIG. 4. Determining the reference color from the reference color name includes associating the reference color name with a color value or range of values in a color space. The recommendation service 102 can search for the reference color name in the palette data store 110, the dictionary data store 112 and/or in another color name service such as the color palette providers 150. The reference color name can be associated with a single color, a range of colors, or a color palette. In the embodiments where one or more secondary color names are available, the reference color can be determined based on either the reference or secondary color names, or their combination.

The reference color can be represented by a value or a range of values in a color space. In some embodiments, the recommendation service 102 can determine a threshold color distance such that any color that has a distance less than the threshold from the reference color is considered to be sufficiently similar to the reference color. In certain embodiments, the threshold color distance is based at least in part on human perceptible color differences. This allows the recommendation service 102 to determine relatively large or relatively small areas within the color space for matching colors with color names. This may be advantageous, for example, where the reference color name suggests a relatively broad range of colors (e.g., "red," "green," "yellow," etc.) or a relatively narrow range of colors (e.g., "bright cerulean," "periwinkle," "sunset orange," etc.). As described earlier, the custom palette criterion may facilitate or control the determination of the reference color. For example, a color-naming bias associated with a geographic region may require filtering of data retrieved from the palette data store 110, the dictionary data store 112 and/or another color name service such as the color palette providers 150 to include only mappings between color names and colors that are derived from a particular geographic region.

In some embodiments, the reference color is determined or derived from one or more color images related to the reference color name (or corresponding secondary color names.) As described earlier, metadata associated with a color image may indicate one or more color names, validated or not, that correspond to colors depicted in the color image. Given the reference color name (or corresponding secondary color names), one or more color images can be identified based on a match or correspondence between the reference/secondary color names and the color names included in color image metadata. As described earlier, the match of color names may be based on partial text string matching, matching of strings and/or words, fuzzy matching, natural language processing, or the like and/or some combination thereof.

Once the one or more color images are identified, representative colors can be extracted therefrom. Various systems and methods for extracting colors from an image are described in U.S. patent application Ser. No. 14/316,483, entitled "IMAGE-BASED COLOR PALETTE GENERATION," filed on Jun. 26, 2014, which is incorporated by reference herein in its entirety. Alternatively or in addition, the color image metadata may also indicate region(s) in the color image that correspond to a color name included in the metadata. For example, the metadata may indicate that a portion of the foreground of the color image corresponds to the color name. In this case, a corresponding reference color can be determined based on the indicated region(s), for example, by averaging RGB color values corresponding to each pixel within the regions. In some embodiments, additional color images can be identified to expand the basis for determining reference colors. For example, an identified color image with matching color names in its metadata may be associated with an existing color palette, which is also associated with one or more additional color images. These additional color images may not have appropriate metadata for direct color name matching, yet they may still be identified as a basis for determining reference colors.

Similarly, the custom palette criterion may facilitate or control the identification of color images. For example, the criterion may indicate that the user is only interested in a category of items, such as apparel. Corresponding filtering can thus be applied to the color image identification process such that only images depicting apparel items are selected. As described earlier, the filtering can be based on metadata associated with color images.

Figure 8:
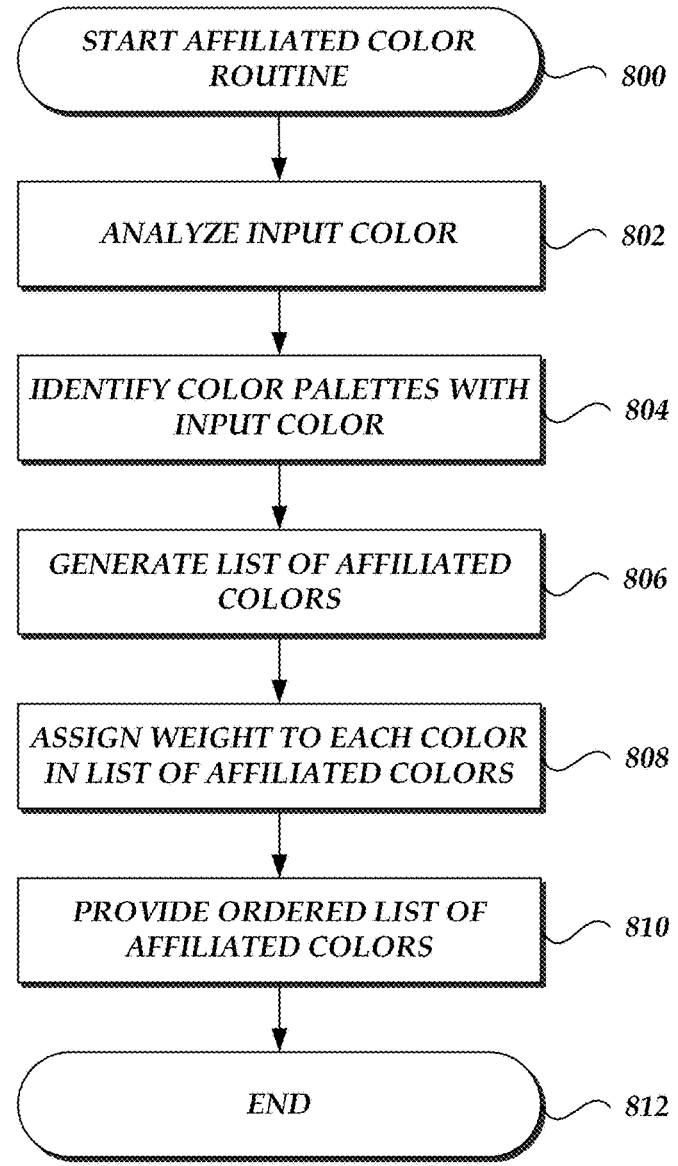
FIG. 8 is a flow diagram illustrating an embodiment of a routine implemented by an affiliated color service for generating an ordered list of affiliated colors, the routine implemented by an affiliated color service.

At block 606, the recommendation service 102 performs the affiliated color routine depicted and described in greater detail herein with reference to FIG. 8, to generate an ordered grouping or list of affiliated colors. The ordered list of affiliated colors contains colors that have been determined to go well with the reference color by a community of users. In some embodiments, at block 606 the recommendation service 102 performs an affiliated color palette routine described in greater detail herein with reference to FIG. 10, to generate an affiliated color palette rather than just a list of ordered affiliated colors. The affiliated color palette routine may be an extension of an affiliated color routine depicted in FIG. 8 that allows a user, system, or service to generate a palette of colors affiliated with the reference color name(s) by iteratively selecting an affiliated color from the ordered list of affiliated colors provided by the affiliated routine depicted in FIG. 8. Similarly, the custom palette criterion may facilitate or control the affiliated color routine depicted in FIG. 8, for example, by indicating a bias or preference for assigning or adjusting weights to colors or indicating a particular category of color palettes that may serve as basis for determining affiliated colors.

The routine depicted in FIG. 6 can be used by a merchandiser (or other vendor) to generate appealing color palettes for their items. The merchandiser can enter in a color name (e.g., "teal") and build a palette of colors affiliated with the color name. The merchandiser can build the palette using colors determined by a community of users to go well with the initial named color. The merchandiser can then create collections based on one or more affiliated color palettes to increase the desirability of the items or item line.

Figure 7:
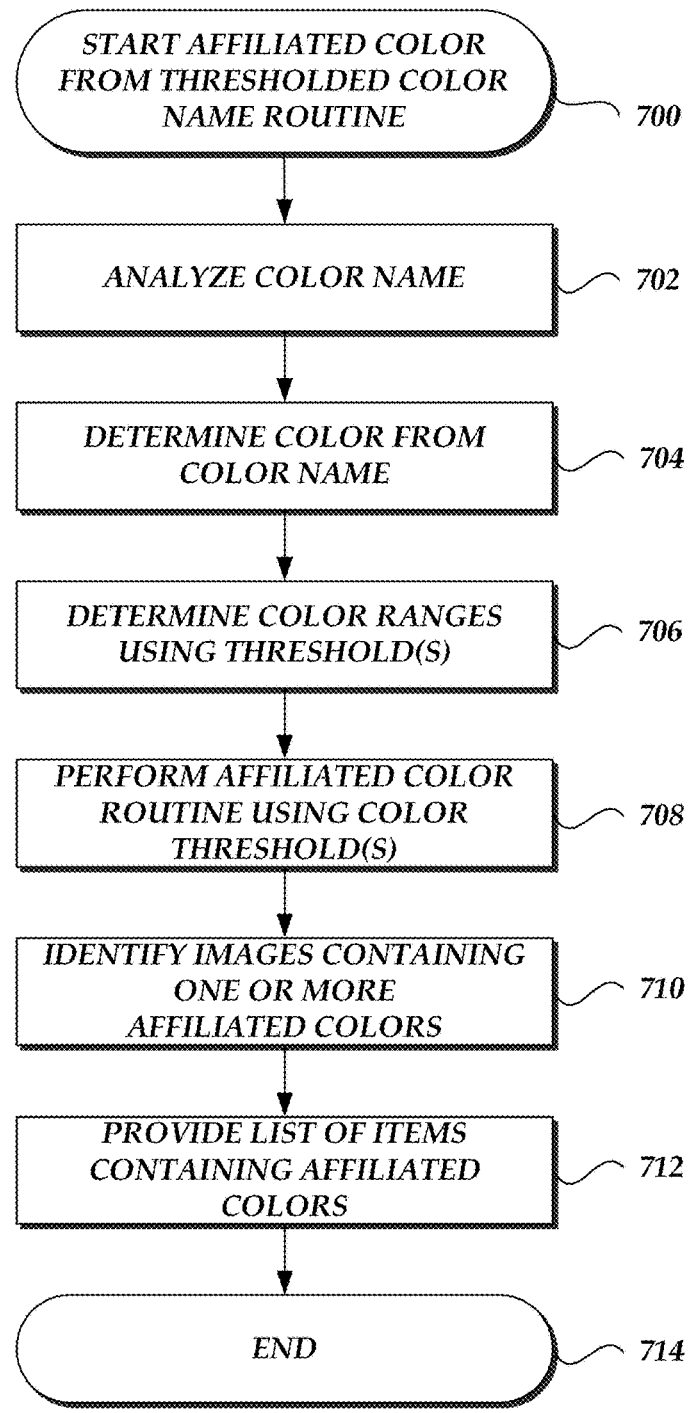
FIG. 7 is a flow diagram illustrating an embodiment of a routine implemented by the recommendation service for generating an affiliated color palette based at least in part on colors determined using an input color name and a color threshold value.

Example Process to Generate an Affiliated Color Palette Using Threshold Values Associated with Color Names FIG. 7 is a flow diagram illustrating an embodiment of a routine implemented by the recommendation service for generating an affiliated color palette based at least in part on colors determined using a reference color name and a color threshold value. The routine can be used as a variation of the routine depicted in FIG. 6 to configure the sensitivity of the affiliated color routine to identify more or fewer affiliated colors based on the input color name. In addition, routine further identifies images and/or metadata that include the affiliated colors. In this way, for example, the routine depicted in FIG. 7 allows a user to input a color name and receive in return images and/or descriptions of items that contain colors affiliated with the input color.

The recommendation service begins the routine at a block 700. At block 702, the recommendation service 102 analyzes a color name, referred to as the reference color name. This is similar to block 402 in routine depicted and described in greater detail herein with reference to FIG. 4. The reference color name can be received from a user (e.g., a third party user 140 via data transmission to the recommendation service 102), from another system, or generated randomly. As described herein, color names may be any type of color identifier and may be provided by one or more surveys such as a human survey of color names and/or human generated data of color names. The recommendation service 102 may use fast color searching techniques, as described in U.S. patent application Ser. No. 14/315,700, entitled "FAST COLOR SEARCHING," filed on Jun. 26, 2014, which is incorporated by reference herein in its entirety, to retrieve one or more names for colors. Additionally or alternatively, a color name associated with a color may be determined based at least in part on color ranges within a color space, as described in further detail herein. In some embodiments, color names may be associated with metadata and/or additional data may be determined to be associated with color names. In some embodiments, data associated with color names may be determined based at least in part on natural language processing or other techniques. As a result, color names associated with a keyword may include filtering of color names based at least in part on metadata. For example, color names associated with heat may be excluded from keywords that generally are associated with coldness.

At block 704, the recommendation service 102 determines a color from the color reference name, referred to as the reference color. This is similar to block 404 in the routine depicted and described in greater detail herein with reference to FIG. 4. Determining the reference color from the reference color name includes associating the reference color name with a color value or range of values in a color space. The recommendation service 102 can search for the reference color name in the palette data store 110, the dictionary data store 112 and/or in another color name service such as the color palette providers 150. The reference color name can be associated with a single color, a range of colors, or a color palette. The reference color can be represented by a value or a range of values in a color space.

At block 706, the recommendation service 102 determines a threshold color distance such that any color that has a distance less than the threshold from the reference color is considered to be sufficiently similar to the reference color. In certain embodiments, the threshold color distance is based at least in part on human perceptible color differences. This allows the recommendation service 102 to determine relatively large or relatively small areas within the color space for matching colors with color names. This may be advantageous, for example, where the reference color name suggests a relatively broad range of colors (e.g., "red," "green," "yellow," etc.) or a relatively narrow range of colors (e.g., "bright cerulean," "periwinkle," "sunset orange," etc.). For more example details on color distance thresholds, see U.S. patent application Ser. No. 14/316,483, entitled "IMAGE-BASED COLOR PALETTE GENERATION," filed on Jun. 26, 2014, which is incorporated by reference herein in its entirety.

Each reference color can be associated with a threshold. The recommendation service 102 considers a color to be a match to the reference color if a distance in a color space between the two colors within the associated threshold.

Figure 10:
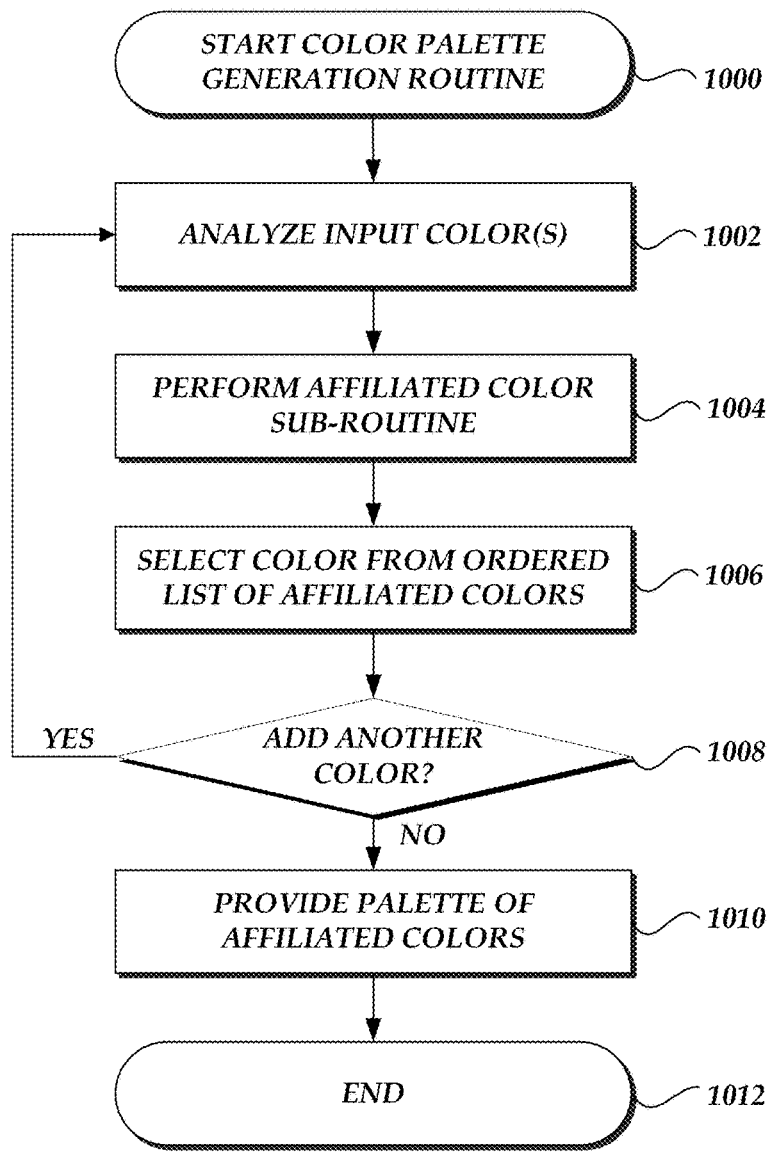
FIG. 10 is a flow diagram illustrating an embodiment of an affiliated color palette generation routine implemented by the affiliated color service.

At block 708, the recommendation service 102 performs the affiliated color routine depicted and described in greater detail herein with reference to FIG. 8, to generate an ordered grouping or list of affiliated colors. As the input color to the routine depicted in FIG. 8, the recommendation service 102 uses the reference color and its associated color distance threshold. The ordered list of affiliated colors contains colors that have been determined by a community of users to go well with the reference color and the colors within the color distance threshold of the reference color. In some embodiments, at block 708 the recommendation service 102 performs the affiliated color palette routine depicted and described in greater detail herein with reference to FIG. 10, to generate an affiliated color palette rather than just a list of ordered affiliated colors. As the input color to the routine depicted in FIG. 8, the recommendation service 102 uses the reference color and its associated color distance threshold. The affiliated color palette routine depicted in FIG. 10 is an extension of the affiliated color routine depicted in FIG. 8 that allows a user, system, or service to generate a palette of colors affiliated with the reference color name(s) by iteratively selecting an affiliated color from the ordered list of affiliated colors provided by the affiliated color routine depicted in FIG. 8.

At block 710, the recommendation service 102 identifies images that contain one or more of the affiliated colors determined at block 708. The recommendation service 102 can retrieve or receive color images for analysis. A color image can depict one or more items (e.g., clothing, furniture, appliances, etc.), a design, a scene, a landscape, or any other content of color. The recommendation service 102 can obtain a color image by retrieving or receiving image data from the item data store 130, third party users 140 (e.g., consumers or merchandisers seeking to sell items), or other image sources, via transmission of image data to the recommendation service 102.

The recommendation service 102 can analyze the color images to extract colors from the image. For an example of extracting colors from an image to obtain a color palette, see U.S. patent application Ser. No. 14/316,483, entitled "IMAGE-BASED COLOR PALETTE GENERATION," filed on Jun. 26, 2014, which is incorporated by reference herein in its entirety. The recommendation service 102 may use fast color searching techniques, as described in U.S. patent application Ser. No. 14/315,700, entitled "FAST COLOR SEARCHING," filed on Jun. 26, 2014, which is incorporated by reference herein in its entirety, to compare the reference color to the extracted colors. The recommendation service 102 can use the color threshold determined at block 706 to identify images having a color within the color threshold.

The recommendation service 102 can compare the affiliated colors to the colors extracted from a color image. If one or more of the extracted colors matches one or more of the affiliated colors, the color image is identified as an image that contains an affiliated color. Colors can be considered to match where the colors are sufficiently similar, such as where the colors are less than a threshold distance apart in a color space. In certain embodiments, the recommendation service 102 can identify an image as containing an affiliated color where the image contains at least one color that matches at least one affiliated color. In some embodiments, the recommendation service 102 can identify an image as containing an affiliated color where the matching color in the image comprises at least a minimum percentage of the image. This may be advantageous to avoid identifying an image as containing an affiliated color if that color appears in a small number of pixels in the image. In some embodiments, the recommendation service 102 can identify an image as containing the affiliated colors where it includes all of the colors in the affiliated color palette, where it includes a majority of the colors in the affiliated color palette, or where it includes at least one color in the affiliated color palette.

The recommendation service 102 can rank or order the identified images based at least in part on the quality of the color matching. For example, where an affiliated color matches a large portion of the image, the image can be ranked relatively high. As another example, where an affiliated color matches a distinct color in the image, the image can be ranked relatively high. An image can be ranked relatively high if it contains a large fraction of the colors in the affiliated color palette.

At block 712, the recommendation service 102 analyzes metadata associated with the images identified at block 710. The recommendation service 102 may rank the matching items in accordance with the closeness of the match to the reference color(s) to provide an item relevancy ranking. Optionally, in addition, a user's preferences may be used in ranking matching items. By way of example, the user's preferences may be determined based on the user's purchase history (which may indicate the colors of items purchased by the user), items is a user's wish list, prior user color-related search queries, or preferences explicitly provided by the user via a preference form or otherwise.

In some embodiments, the recommendation service 102 generates a filtered set of items based at least in part on the quality of color matching between the affiliated color palette and the colors in the image and the image metadata. In some embodiments, the recommendation service 102 utilizes a text query to further filter out items that do not sufficiently match the information in the query. For example, if the text query specifies "blue couch," a blue shirt will be excluded from the set of items. Optionally, the recommendation service 102 may rank the filtered list according to the ranking of matching items performed at block 710. Optionally, the color recommendation service 102 may rank the filtered list according to the ranking of closeness of the item color to the affiliated color palette. As yet another option, some combination of the ranking of matching items performed at block 710 and a ranking based on the closeness of the item color to the affiliated color palette may be used to generate a further relevancy ranking of items.

The identified images may be ranked in accordance with a determination as to how closely a given image corresponds to the affiliated color palette. For example, an affiliated color palette may have an assigned weight indicating which is the most dominant color (where a color may or may not be a shade of a color), the second most dominant color, and so on. Optionally, only images that match within a percentage of the affiliated colors, or only a specified maximum number of images will be identified (e.g., the 10 closest images). Other factors may be taken into account in weighting images. For example, attitudes and perceptions of colors, and what colors coordinate with what colors, may change over time, based on gender, geographic region, ethnic group, age, etc. Thus, the image weighting may be based at least in part on one or more of the image date, and optionally on one or more of the user's gender, geographic region, ethnic group, age, culture, religion, language, palette popularity trends, etc.

In some embodiments, the recommendation service 102 provides the recommended items and/or images. The items and/or images can be provided for display on a user device (e.g., via a browser installed on the user device, via a dedicated application such as a mobile device app, or otherwise) as recommended items based at least in part on the color palette (e.g., which may include a user's query). The recommended items may be in the form of only images of the matching items, where the images may be retrieved from the item data store 130. The recommended items may be in the form of only text identifying and/or describing the matching items, where the text may be retrieved from the item data store 130. The recommended items may be in the form of both images of the matching items and corresponding text retrieved from the item data store 130. Optionally, controls may be provided to the user that the user can use to indicate that a larger or a smaller number of matching items are to be presented. In response, the recommendation service 102 may accordingly modify the number of items presented to the user. For example, if the user indicates that fewer items are to be presented to the user, the recommendation service 102 may present the higher ranked items and not present a number of lower ranked items that had previously been presented. The recommendation service 102 ends the routine at block 714.

Example Process to Generate a List of Affiliated Colors

FIG. 8 illustrates a flow diagram of an example routine implemented by the affiliated color service 105 for generating a weighted or ordered list of affiliated colors. The affiliated color service 015 begins the routine at block 800. At block 802, the affiliated color service 105 analyzes an input color. The input color can be received from a user (e.g., a third party user 140 via data transmission to the affiliated color service 105), from another system, or generated randomly. In some embodiments, the input color can be extracted from an image, such as an image provided by a user or an image of an item in an item catalog or on a network site. For more details on extracting colors from an image, see U.S. patent application Ser. No. 14/316,483, entitled "IMAGE-BASED COLOR PALETTE GENERATION," filed on Jun. 26, 2014, which is incorporated by reference herein in its entirety.

In some embodiments, the input color is determined based at least in part on preferences, behavior, or properties of a user. A system can analyze properties of the user and determine one or more colors that the user is likely to prefer. For example, the affiliated color service 105, or other system, may have access to a user profile that includes, for example and without limitation, media preferences (e.g., preferred movies, TV shows, books, music, etc.), purchase history (e.g., items purchased in an electronic marketplace), browse history (e.g., items browsed in an electronic marketplace), demographics (e.g., age, gender, nationality, etc.), geographical location (e.g., where the user resides and/or previously resided), item preferences (e.g., through the use of wish lists), and the like. The affiliated color service 105 can analyze such information and determine probable colors that the user would like. One or more of these colors determined by the affiliated color service 105 can be used as the input color. As another example, the affiliated color service 105, or other system, can compare users to determine an input color. For a particular user, the affiliated color service 105 can analyze the color preferences of similar users (e.g., where similarity of users can be based at least in part on purchase history, media preferences, demographics, etc.) to determine one or more input colors that the particular user would prefer. This can be done by identifying another user with similar preferences and/or by aggregating user profile information to identify color preferences for an average user with similar preferences.

In block 802, analyzing the input color image can include determining the components of the color, such as the primary color values (e.g., RGB values), the luminance-chrominance values (e.g., YUV or YCbCr values), or the like. Analyzing the input color image can also include determining a threshold within which a color will be considered to be the same as, or sufficiently similar to, the input color. The threshold can be based on color distance according to a color distance formula(e). An example of such a formula is based on a human perceptible color difference. For more information on how to determine a human perceptible color difference and the human color distance formula, see U.S. patent application Ser. No. 14/316,483, entitled "IMAGE-BASED COLOR PALETTE GENERATION," filed on Jun. 26, 2014, which is incorporated by reference herein in its entirety.

At block 804, the affiliated color service 105 identifies a plurality of color palettes that include the input color. The color palettes can be provided by the color palette providers 150. In some embodiments, one or more color palettes can be provided by the palette data store 110 where the palettes stored therein have been voted on, ranked, and/or rated. In some embodiments, the plurality of color palettes can be provided by the third party users 140.

The affiliated color service 105 determines that a palette contains the input color when that palette has at least one color that falls within the threshold color distance from the input color, as determined at block 802. In this way, palettes that include colors that are not identical to the input color but that include colors that are sufficiently close to the input color are included in the list of palettes identified at block 804. In some embodiments, the affiliated color service 105 can use a fast color indexing routine to pull colors from the palettes, as described in U.S. patent application Ser. No. 14/315,700, entitled "FAST COLOR SEARCHING," filed on Jun. 26, 2014, which is incorporated by reference herein in its entirety.

At block 806, the affiliated color service 105 generates a list of affiliated colors. The list of affiliated colors comprises the colors from the list of palettes identified at block 804, excluding the input color and those colors that are sufficiently close to the input color. In some embodiments, the list of affiliated colors can include all the colors from the list of palettes. In certain embodiments, the list of affiliated colors is concatenated based at least in part on a threshold number of colors to include in the list, a desired or targeted color variety, color exclusion rules, or the like.

At block 808, the affiliated color service 105 assigns weights to each color in the list of affiliated colors. The affiliated color service 105 loops through each color in the list, identifies from which palette the color originated, and adjusts a weight of the color based at least in part on the ranking, rating, and/or number of votes associated with the originating palette. Adjusting the weight of the color can include increasing the weight factor by a number of votes or average rating of the originating palette. In some embodiments, adjusting the weight of the color includes scaling the ranking, rating, and/or number of votes based at least in part on a number of factors that can include which users voted on the palette, the age of the palette, the number of comments on the palette, the geographical location of the voters, and the like. In some embodiments, the ranking, rating, and/or voting of a palette is distributed among the colors within a particular palette based at least in part on color popularity, ranking of colors within a palette, or the like. In certain embodiments, each color in a palette has an individual ranking, rating, and/or number of votes where the rating can be associated with the rating of the palette or independent from the rating of the palette.

Where a color appears in more than one palette, the weight of that color can be determined at least in part by aggregating the weights from each originating palette. One aggregation method is to add the weights of each originating palette. As an example of a simple case, where a color appears in 3 palettes, the weight of that color can be equal to the sum of the votes of each of the 3 palettes. It is to be understood that other weight aggregation schemes can be used without departing from the scope of this disclosure. For example, weights can be aggregated using a weighted average of votes, an arithmetic mean of votes, or using some other algorithm (where votes can be the number of votes for a palette, the average rating of a palette, or the ranking of a palette). Weight aggregation can also be configured to account for rating of a palette or color as a function of time and/or geographical location.

The affiliated color service 105 can use a similar color distance threshold when aggregating weights for an affiliated color. For example, a color distance threshold can be used such that when the affiliated color service 105 is determining a weight for an affiliated color, it aggregates the votes from the palettes containing that affiliated color and the palettes that contain a color with a distance from the affiliated color that is less than or equal to the color distance threshold. The color distance threshold used in analyzing the input color at block 802 and the color distance threshold used in weighting affiliated colors at block 808 can be the same or different and may be based on the same or different color distance algorithms.

At block 810, the affiliated color service 105 tallies the weights of each color and provides a weighted, ordered, and/or ranked list of affiliated colors, where the rank of an affiliated color is based at least in part on the relative weight of the color. The affiliated color service 105 can concatenate the ordered list of affiliated colors based at least in part on a desired or targeted number of colors to include in the list, a threshold weight factor to include in the list, a variety of colors in the list, color exclusion rules, or the like.

The affiliated color service 105 ends the routine depicted in FIG. 8 at block 812.

Figure 9:
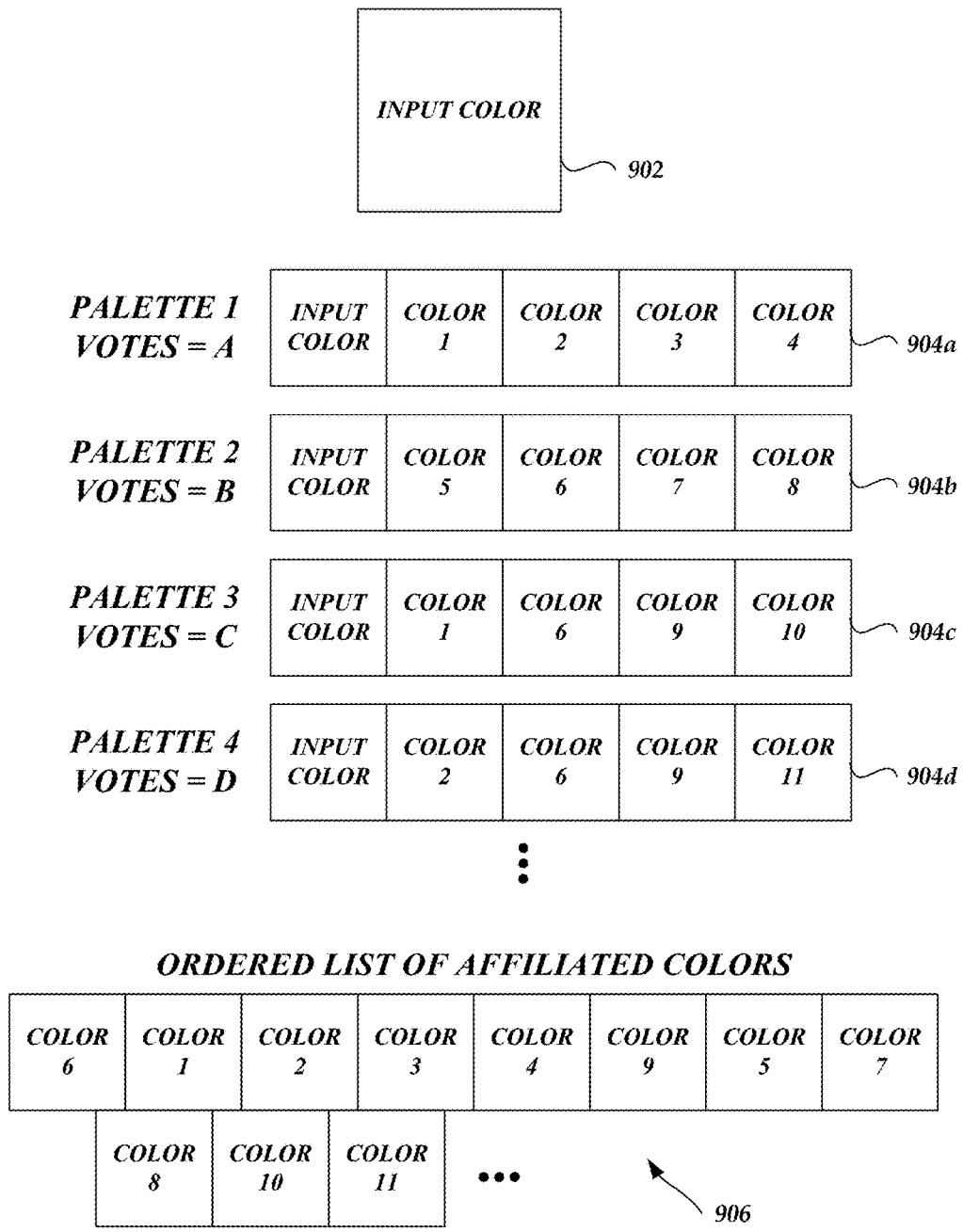
FIG. 9 illustrates an example ordered list of affiliated colors generated by the example routine of FIG. 8.

FIG. 9 illustrates an example list of affiliated colors 900 generated by the example routine of FIG. 8. Starting with the input color 902, the affiliated color service 105 identifies a number of palettes 904a-904d, each of which includes the input color or a color sufficiently similar to the input color (e.g., where the color distance between the color in the palette and the input color is less than a color distance threshold). The palettes 904a-904d can be from a data store of human- or machine-created color palettes, but that have been voted on, ranked, or rated by a community of users. As used herein, the terms votes, rating, and/or ranking are used to indicate that there is a value associated with the palette where the value is indicative of a level of human preference for the palette. Where only a single term is used (e.g., only vote, ranking, or rating), it is to be understood that the other terms could also be used. The rating of a color palette can be based on a number of votes, such as where a palette's score can be incremented by a value according to a positive vote by a user, or similarly decremented by a value according to a negative vote by a user. Similarly, the rating of a color palette can be based on a rating system where users can rate palettes on a rating scale (e.g., 0 to 5, 1 to 5, 0 to 10, −5 to 5, etc.). Likewise, the rating of a color palette can be based on users ranking palettes relative to one another.

Each time a palette is identified that contains the input color, or a color sufficiently close to the input color, each of the other colors in the palette is added to a list of affiliated colors. Each of the colors on the list of affiliated colors receives a weight that corresponds to the rating of the originating palette. For example, each of colors 1-4 in palette 1 904a is assigned a weight corresponding to the number of votes for palette 1 904a, represented by the variable A. Likewise, each of the colors in palettes 2-4 904b-904d is assigned a weight corresponding to the number of votes for each palette, represented by the variables B-D.

If a color is found in more than one palette, the weight of the color is adjusted based on the rating of each of the originating palettes. For example, color 1 is found in palette 1 and palette 3, so the weight of color 1 is based on the number of votes A+C. In some embodiments, an affiliated color is considered to be found on another palette (e.g., other than its originating palette) when the color in the other palette has a color distance that is less than a color distance threshold from the affiliated color. In some embodiments, the weighting of colors is analyzed as a function of position in a color space where the distribution of weighted colors is analyzed to determine maximums. This may be able to provide additional details about which colors are generally considered to go well with the input color, which may result in the ability to provide multiple suggestions of colors within and/or around a peak color in the color space.

In some embodiments, the list of affiliated colors is adjusted to combine colors that are close to one another based at least in part on a color distance formula. This element can be used to decrease the number of different colors where some colors are sufficiently similar to one another. This can be used to reduce the number of variations of a color, especially where the variations are insignificant, imperceptible, or otherwise lacking in value to a user.

Once the weights of each affiliated color is determined, a weighted or ordered list of affiliated colors 906 can be provided. The ordered list can include all the different colors from the palettes 904a-904d or it can contain a subset of these colors. The ordering of the list can be based at least in part on the weight of each color (e.g., higher weighted colors are ranked higher). As illustrated in the figure, the colors 1-11 are ranked according to the sum of the votes for each color, where A is greater than B, which is greater than C, which is greater than D. Accordingly, using an aggregation scheme based on the sum of weights, color 6 has a weight of B+C+D, color 1 has a weight of A+C, color 2 has a weight of A+D, etc.

In some embodiments, the ratings of the palettes are time-dependent. The affiliated color service 105 can use the time-dependent ratings to identify trends in color combinations and/or to identify color combinations that are relatively stable over time (e.g., classic color combinations). This can also be used to determine color combinations that were popular at a particular time.

Time-dependent ratings can also be used to predict color trends in the future. For example, the most popular colors can be tracked as a function of time, with the result plotted in a color space. The path through the color space of the most popular color (e.g., which color is the most popular color at a point in time) can be used to project what the most popular color will be at some point in the future. For example, the affiliated color service 105 can determine a directional shift of the most popular color within the color space as a function of time and project based on the directional shift. The affiliated color service 105 can then provide suggestions of color combinations based on projections of which colors will be popular at a point in time. This may be useful, for example, for visual artists to predict trends in colors and/or color combinations. It is to be understood that this projection technique can be used for the most popular color as well as the second most popular, third most popular, etc. It is also to be understood that this projection technique can be used for color palettes as well as individual colors.

In some embodiments, geographical information can be included with the ratings of the palettes (e.g., ratings of a palette can be provided as a function of location of the voting user). The affiliated color service 105 can use the geography-associated ratings to identify color combinations that are generally associated with a geographical location. For example, users within a geographical region may prefer a color combination associated with a sports team from that geographical region. The affiliated color service 105 can use information about the user (e.g., where the user is located) to suggest color combinations that utilize the geography-associated ratings of palettes.

Example Affiliated Color Palette Generation Process

FIG. 10 illustrates a flow diagram of an affiliated color palette generation routine implemented by an affiliated color service 105. The affiliated color service 105 begins the routine at block 1000. At block 1002, the affiliated color service 105 analyzes an input color or colors. The input color or colors can be received as described above with respect to block 802 of the affiliated color routine illustrated in FIG. 8. Analysis of the input color or colors can include the functions described herein with reference to block 802 in FIG. 8. Returning to FIG. 10, in some embodiments, the routine can accept a plurality of input colors in determining a color palette, a particular example of which is described in U.S. patent application Ser. No. 14/316,292, entitled "BUILDING A PALETTE OF COLORS BASED ON HUMAN COLOR PREFERENCES," filed on Jun. 26, 2014, which is incorporated by reference herein in its entirety. In such a case, analyzing the input colors can include repeating, for each input color, the element of analyzing the input color as described with reference to block 802 in FIG. 8.

With reference to FIG. 10, at block 1004, the affiliated color service 105 performs the routine depicted and described herein with reference to FIG. 8. In some embodiments, the affiliated color service 105 can move to block 804 upon entering the routine because the input color or colors has been analyzed in block 802. As described, the output of the routine depicted in FIG. 8 is a weighted or ordered list of affiliated colors. The routine depicted in FIG. 8 can be modified to provide the ordered list of affiliated colors where there is a plurality of input colors. For example, the affiliated color service 105 can identify palettes that include one or more of the plurality of affiliated colors. In some embodiments, the affiliated color service 105 identifies palettes that include all of the input colors. In some embodiments, the affiliated color service 105 identifies palettes that include at least one of the input colors. Once the palettes are identified, the weighting of the list of affiliated colors can proceed much the same way as described herein. In some embodiments, the weighting scheme of the affiliated colors is modified based on the input colors. For example, the popularity of each of the input colors can be used to normalize or scale the weighting factors of palettes of the respective input colors.

At block 1006, the affiliated color service 105 selects a color from the ordered list of affiliated colors. The selection can be based on user input through a user interface. For example, the routine can be interactive such that a user provides the affiliated color service 105 with the input color(s) and is provided the ordered list of affiliated colors generated at block 1004. The user can then select a color from the ordered list and indicate the selection to the affiliated color service 105. In some embodiments, the affiliated color service 105 selects a color from the ordered list of affiliated colors. The selection can be based at least in part on any one or more of the weighting of the affiliated color, the color distance of the affiliated color from the input color and/or other affiliated colors on the list, a selection criteria determined by a user or other system, or the like. Selection of the color from the ordered list of affiliated colors adds that color to the palette that includes the input color(s). In some embodiments, a plurality of colors can be selected.

In some embodiments, the affiliated color service 105 can select two or more colors from the ordered list of affiliated colors and provide a projection of what palettes would look like based on the selected colors. For example, the affiliated color service 105 can select the two most popular colors from the ordered list of affiliated colors (e.g., the two colors with the highest weight) and create a first tentative color palette that contains the input color(s) and the first popular color and a second tentative color palette with the input color(s) and the second popular color. The affiliated color service 105 can then provide a weighted or ordered list of affiliated colors for each of the two tentative color palettes. This can be accomplished, for example, through the routine depicted and described herein with reference to FIG. 8. This can advantageously be used to show a direction a color palette may go based on selection of a particular color for a color palette. In certain embodiments, the affiliated color service 105 can select the two or more colors based on user input, input from another system, random selection, or any combination of these.

In various embodiments, the affiliated color service 105 can recursively provide tentative color palettes to provide a variety of tentative color palettes. For example, for the two tentative color palettes described above, the affiliated color service 105 can select the two most popular colors from the ordered list of affiliated colors associated with each tentative color palette to generate a second level of tentative color palettes. This process can continue a number of times to provide the variety of tentative palettes. The affiliated color service 105 can select a different number of colors in each iteration of this routine and for each tentative palette. The affiliated color service 105 can select the two or more colors based on criteria that includes, for example and without limitation, color popularity, color variety, exclusion rules, color distance, or any combination of these.

At block 1008, the affiliated color service 105 determines whether another color will be added to the palette. If another color is to be added, routine returns to block 1002 to analyze the input colors, which now include the color selected in block 1006.

If the palette is finished (e.g., no other colors are to be added to the palette), the affiliated color service 105 proceeds to block 1010 where the affiliated color service 105 provides the palette of affiliated colors. As illustrated in FIG. 1, the provided palette of affiliated colors can be stored in palette data store 110, sent to the third party users 140, and/or sent to the color palette providers 150. The affiliated color service 105 ends the routine at block 1012.

Figure 11:
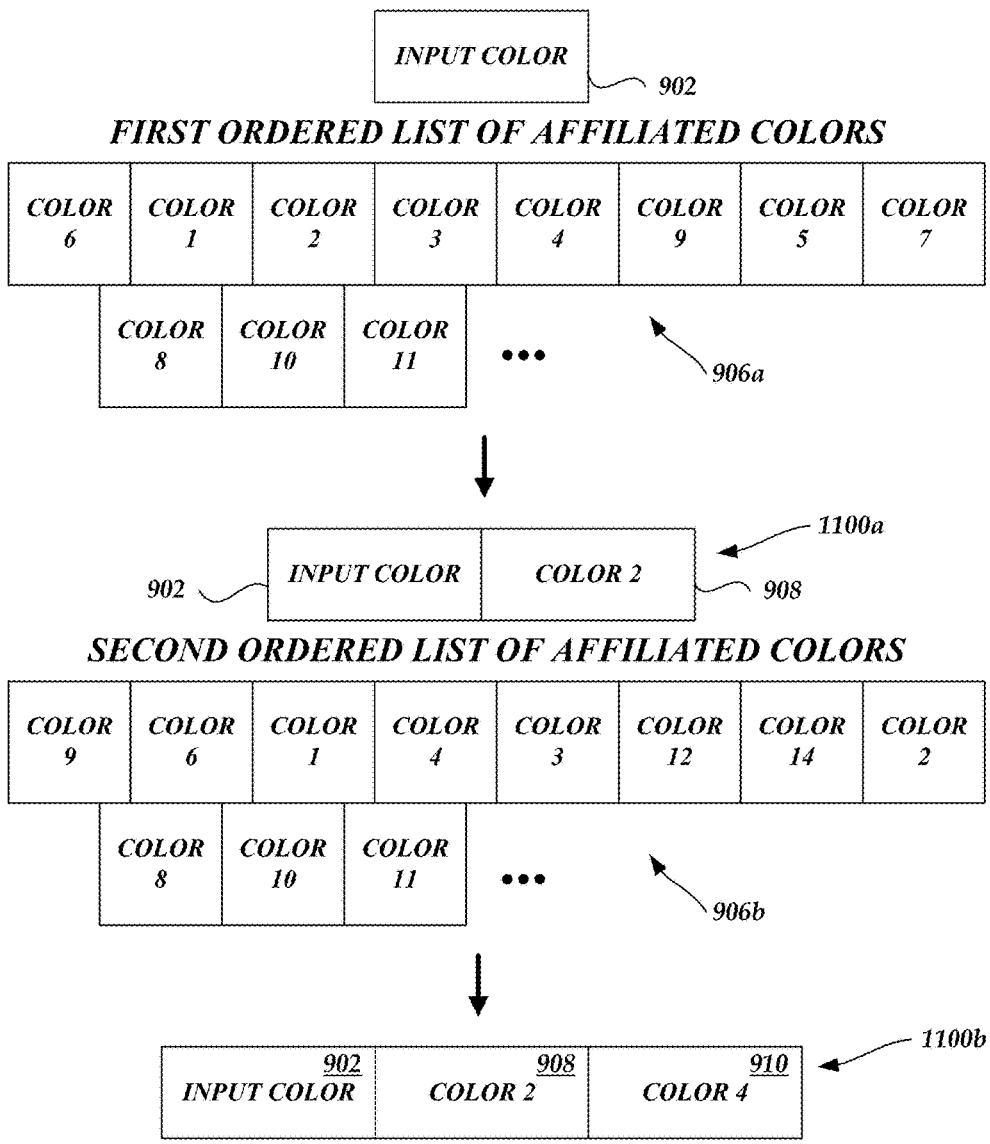
FIG. 11 illustrates example affiliated color palettes generated by the routine of FIG. 10.

FIG. 11 illustrates example affiliated color palettes 1100*a* and 1100*b* generated by the routine of FIG. 10. Starting with an input color 902, a first ordered list of affiliated colors 906*a* is generated, as described with reference to FIG. 9. A color can be selected from the first ordered list of affiliated colors 906*a*. This results in a color palette 1100*a* that includes the input color 902 and the selected color 908 (e.g., color 2 from the first ordered list of affiliated colors). The new color palette 1100*a* can then be used to generate a second ordered list of affiliated colors that now includes colors associated with the input color 902 and the selected color 908. Because new and/or different palettes have been included in the routine to determine the ordered list of affiliated colors, the order of the affiliated colors may change. In addition, the second affiliated color list 906*b* may include colors not present in the first ordered list of affiliated colors 906*a*. This process can be repeated to build up a color palette with a plurality of colors, such as color palette 1100*b*.

In some embodiments, as the number of input colors increases, the number of affiliated colors decreases. The affiliated color service 105, for example, may limit the identified palettes to those that include all of the input colors or a majority of the input colors. This may desirable to reduce the number of potential colors in the affiliated color list that may result in visually unappealing color combinations. In this way, the palette generation is self-limiting as the more colors in the palette the fewer affiliated colors that are presented.

By using the votes of a community of users, the generated color palettes represent a subjective color combination that may be different from what a mathematical formula may provide and that is generally preferable to users. Using human arbiters to generate color combinations can provide color palettes that mathematical algorithms may be incapable of fully determining.

The input color or colors can be determined or provided by a user, a computer system, or a combination of both. For example, a user may want to build an outfit that includes the color pink. Based on this input color, the affiliated color service 105 can provide an ordered list of affiliated colors that have been determined by a community of users to go well with the input color. As another example, a user can select the color pink as an input color and the affiliated color service 105 can be configured to select a one or more additional colors randomly or through another algorithm to provide a suggested color palette (or multiple color palettes). As another example, the user can pick an item (or a collection of items) and a color fingerprint (or a subset of it) can be used as the basis for determining affiliated colors. For an example of extracting a color fingerprint from an image of an item, see U.S. patent application Ser. No. 14/316,483, entitled "IMAGE-BASED COLOR PALETTE GENERATION," filed on Jun. 26, 2014, which is incorporated by reference herein in its entirety. Any of these color palettes could then be used to identify and/or filter potential items for the user.

For more example details on generating affiliated color palettes, see U.S. patent application Ser. No. 14/316,292, entitled "BUILDING A PALETTE OF COLORS BASED ON HUMAN COLOR PREFERENCES," filed on Jun. 26, 2014, which is incorporated by reference herein in its entirety.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal. A software module can comprise computer-executable instructions that cause a hardware processor to execute the computer-executable instructions. The computer-executable instructions can comprise a scripted computer language and/or a compiled computer language. Computer-executable instructions can comprise, for example and without limitation, JAVASCRIPT®, PYTHON™, php, SQL, C, C++, JAVA®, C#, Fortran, BASIC, shell scripts, Perl, or the like.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes that come within the meaning and range of equivalency of the claims are to be embraced within their scope.

Generally described, aspects of the present disclosure relate to creating a fast color search data store and/or performing a fast color search by one or more computing devices. Searching by color (e.g., a specific RGB color or a RGB color range) in a structured data store can be challenging due to the multidimensional nature of colors. Such a data store may include 3-dimensional RGB colors that are associated with objects in a relational database or some other type of data store. For example, the RGB color value (e.g., #c108e5) may be stored in the data store in association with a green dress, a green image, or any other data object with a green association.

The RGB color values in such a data store may be indexed for searching. A data store index may be a data structure that improves the speed of data retrieval operations on a data store table at the cost of additional writes and the use of more storage space to maintain the extra copy of data. Indexes are used to quickly locate data without having to search every row in a data store table every time a data store table is accessed. Indexes can be created using one or more columns of a data store table, providing the basis for both rapid random lookups and efficient access of ordered records. Such an index on a traditional integer field may allow for quick lookups within an integer range. For example, on an indexed integer field, a search of "between 2000 and 3000" may quickly return all records with integer fields between 2000 and 3000, and can be orders of magnitude faster than a comparison of integer values in all rows.

However, an index of an n-dimensional color value, such as an index of an RGB field, does not assist or speed up searching n-dimensional color ranges. In many scenarios, an RGB color value may be associated in a data store with object records in a data store. The RGB field may also be indexed. However, traditional data stores do not inherently index an RGB field correctly. For example, an RGB value (e.g., #c108e5 in hex) includes three dimensions: the red dimension ("c1"), the green dimension ("08"), and the blue dimension ("e5"). The bits in these separate hex values are arranged by dimension, but are not arranged in highest order to lowest order across all dimensions, which makes range comparisons difficult to perform with a single index. For example, the red dimension's bits in RGB come first, which includes both high order red bits through low order red bits. This is followed by green high order bits through low order bits, which is again followed by blue high order bits down to low order bits. Thus, if a color search range was specified as (#c001e0 through #cf10f0), a single traditional index cannot be used to quickly determine which of the records have associated colors within the range because such a lookup is dependent on an index data structure where all the bits in a field are ordered from highest to lowest order (e.g., usually an integer value or similar data type).

One way to solve this problem may be to have multiple index fields in a data store corresponding to each of the dimensional colors. For example, there may be one field for red (e.g., which may contain as a part of one record the value "c1"), another for green (e.g., which may contain as a part of one record the value "08"), and yet another for blue (e.g., which may contain as a part of one record the value "e5"). Each of these fields may be indexed individually. Thus, when ranges are searched, each index may be used for comparison to the indexed individual colors (e.g., for the range #c001e0 through #cf10f0, the range "c0" through "cf" may be applied to the red index, the range "01" through "0f" may be applied to the green index, and the range "e0" through "f0" may be applied to the blue index). The data store must then determine whether all three indexes indicated that a record was within the respective ranges.

The downside to the foregoing type of dimensional indexing is that a data store must search three indexes instead of one, and then make a comparison of whether all the criteria have been met for all indexes. This procedure is usually less efficient than using a single index to perform a search.

The embodiments described herein allow for increased query speed and fast searching, and overcome many of the drawbacks described above. More generally, in addition to color spaces, the techniques described herein may allow for fast searching of any multi-dimensional space, such as a traditional 3-dimensional coordinate space. For example, in a 3D video game, objects may be located in a 3-dimensional coordinate space on a map (e.g., an X horizontal dimension, a Y depth dimension, and a Z vertical dimension, where each dimension is orthogonal to the other dimensions). In such a video game, a fast searching technique that collapses a 3-dimensional coordinate search range into interleaved one-dimensional integer search ranges, as described herein, may be used to quickly find video game objects within the 3-dimensional coordinate search range.

In one embodiment in accordance with the present disclosure, an n-dimensional color space can be converted into a 1-dimensional color space. For the sake of brevity, although the embodiments described herein often refer to RGB color, which is a 3-dimensional color space, other dimensional color spaces (e.g., 4 or 5 dimensions, etc.) may use one or more of the same techniques described herein to gain the same advantages described for the RGB 3-dimensional color space. Thus, the same or similar techniques may be applied to the color spaces of XYZ, Hue Saturation Brightness/Luminance (HSB/HSL), Hue Saturation Value (HSV), Hue Saturation Intensity (HIS), Cyan Magenta Yellow Key (CMYK), Lab, Lightness Chroma Hue (LCH), LMS, YCbCr and Y'CbCr as used in image or video, Tint Saturation Lightness (TSL), Red Green (RG), YIQ (as used by NTSC color TV system), and YUV (as used by the PAL color TV system). As would be recognized by one skilled in the art, in color spaces that do not use an integer format for a color dimension, the techniques described herein may still be applied by converting a floating point dimension value to an integer dimension value.

Each of the colors in the RGB color space, namely red, green, and blue, can be represented by a single byte of data (8 bits). By interleaving the three colors of bits (e.g., where each character represents one bit: RGBRGBRGBRGBRG-BRGBRGBRGB as will be further described in reference to FIG. 14), one can form a 24 bit integer that is uniquely representative of each color yet has only a single dimension. One advantage of interleaving the RGB bits is that the order of importance of the bits is preserved. Generally, colors which are close in terms of human perception are also close together on this integer range (e.g., they tend to have the same higher order bits).

One advantage of preserving the order of the bits is that such ordering effectively represents the 3-dimensional color values distance from black (i.e., #000000) and white ((i.e., #FFFFFF). Higher order bits generally indicate a larger distance from black (i.e., closer to white), whereas less high order bits and more low order bits generally indicate a greater distance from white (i.e., closer to black). Thus, in effect, the interleaved values may be considered grayscale values.

For each color in a data store, a column may be added to hold its equivalent 24 bit interleaved integer. A standard data store integer index may be added to a table with this column. Such an index on an interleaved color value may be considered a grayscale index value. When a search is performed based on an RGB color range, preprocessing may occur that converts the color range to a plurality of interleaved color ranges. The preprocessing may determine one or more binary splits in each individual color byte. For example, if the red color range runs between "00001110" and "00010001," then the preprocessing may convert the red color search into two ranges ("00001110" to "00001111") and ("00010000" to "00010001") that can be permuted (and interleaved) with the determined ranges from the other colors green and blue.

Figure 12:
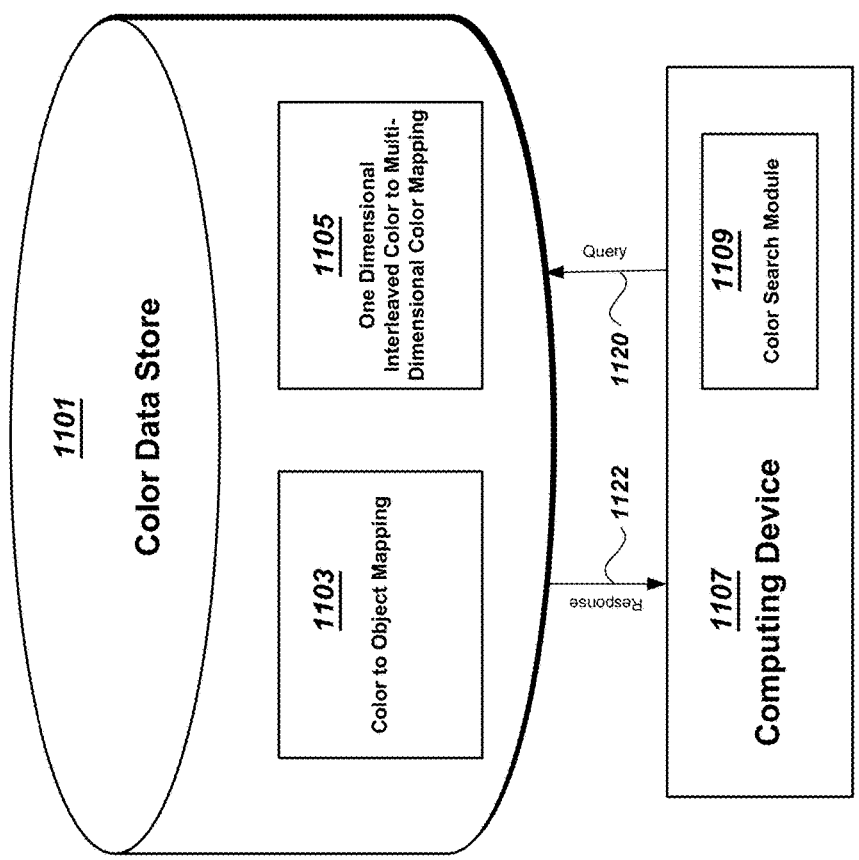
FIG. 12 is a block diagram depicting an illustrative network topology of a fast color searching system.

Turning now to FIG. 12, a block diagram is shown that illustrates a color data store 1101 that is searchable by a computing device 1107. Color data store 1101 may be any type of data store that allows for integer indexing, including a relational database such as an SQL database, or a hierarchical data store. Color data store 1101, while stored on one or more non-transitory, computer readable media, may include one or more logical data stores, each logical data store including one or more data store tables. Color data store 1101 may be implemented in a single computing device capable of executing software instructions to provide data store services, and/or many computing devices capable of together providing data store services (e.g., allowing for mirroring, backups, etc.). In yet other embodiments, color data store 1101 may be implemented as a web service or by one or more virtual machines in a hosted computing environment. The hosted computing environment may include one or more provisioned and released computing resources, which computing resources may include computing, networking and/or storage devices.

Color data store 1101 may include one or more tables with color columns. For example, table 1103 may include a plurality of records, each record including data for an object (or a reference to an object such as an object identifier) and associated with an RGB color. For example, each object reference in table 1103 may identify an item that one can buy on a network site (a jacket, a book, a stapler, a service, etc.). The item's data may be in table 1103 or in a separate table or data store accessible via the item's identifier. Each item may be associated with one or more RGB colors in the table (e.g., a color mapping). The colors associated with the object may be derived by analysis of a picture of the object. Various methods and systems for extracting colors from an image are described in U.S. patent application Ser. No. 14/316,483, entitled "IMAGE-BASED COLOR PALETTE GENERATION," filed Jun. 26, 2014; U.S. patent application Ser. No. 14/316,530, entitled "IMAGE-BASED COLOR PALETTE GENERATION," filed Jun. 26, 2014; U.S. patent application Ser. No. 14/316,528, entitled "IMAGE-BASED COLOR PALETTE GENERATION," filed Jun. 26, 2014; and U.S. patent application Ser. No. 14/316,549, entitled "IMAGE-BASED COLOR PALETTE GENERATION," filed Jun. 26, 2014, each of which is incorporated by reference herein in its entirety.

In some embodiments, table 1103 may contain one or more mappings of an object to a color. Multiple rows in the data store may indicate that an object, such as an image object, is mapped to RGB coded colors for pinkish/purple, Easter blue and forest green for instance. Thus, a query of table 1103 on a specific color may reveal one or more objects/items mapped to that color in the data store.

In the same table, or a separate table, such as table 1105, the RGB colors may be mapped to a one dimensional integer value. The one dimensional integer value may include interleaved bits of the RGB coded colors. For example, if the color coding for Easter blue is #44EDE5, then the interleaved 24 bit integer may look like 011111011000010111000011 (as represented in bits). Interleaving is further described with reference to FIG. 14 described herein. In some embodiments, tables 1103 and 1105 may be the same, where objects may be mapped directly to the flattened one dimensional 24 bit integer representation of a color.

The data store table(s) may be queried using the 24 bit integer to determine one or more objects associated with a color. In some embodiments, the data store 1101 may receive an SQL query to determine if one or more objects have an associated color within the color range. For example, an SQL "where" clause statement may be a parameter that is used to search on a color range (e.g., "where 24intcolor between '239874' and '736583'"), where values in column "24intcolor" are the interleaved 24 bit colors. Using a mapping of the 24 bit color to the RGB color (or, in some embodiments, simply mapping straight to an object) allows the data store to identify and return those objects that are associated with the range of colors searched.

Color data store 1101 may be connected to many devices, directly or indirectly, on a network (e.g., a private network, the Internet, etc.) that allows the data store to receive queries and transmit search results. The data store may be one device (e.g., a data store server), multiple devices, or in remote computing devices such as remotely hosted on the Internet/cloud.

Computing device 1107 may be able to issue a query 1120 and access the data store 1101 via networking such as IP networking (Internet, intranet, combination of both, etc.). Computing device 1107 may be a server (or a server farm or hosted computing device(s)) that has received a client color inquiry, processed the inquiry via a color search module 1109, and generated one or more interleaved color ranges as described herein. The query 1120 may then be sent to the data store 1101 for resolution. The data store 1101, after receiving the query 1120 (e.g., an SQL query), may process the query 1120 and return a response 1122 including search results after comparing the interleaved color ranges to the interleaved color ranged index (e.g., included in table 1105). Such a comparison may result in one or more matching colors or objects (e.g., items or images) that may be returned in a response 1122. The computing device 1107 may then use the returned colors and/or objects for any purpose (e.g., returning an item to a client device, showing matching colors to a user that falls within the specified range, etc.).

In some embodiments, color data store 1101 may be connected to computing device 1107 directly rather than through a traditional communication network. For example, the computing device 1107 may store color data store 1101 and execute a data store process to answer queries, as well as execute network server (or other server) processes to accept user color queries through the Internet, or through a local user interface. The color search module 1109 may then process the color queries, send interleaved color ranges to the data store processes, and receive a response.

In some embodiments, the computing device 1107 may include a user device (e.g., a home or office computer, smartphone, tablet, a wearable computing device, etc.) that includes an arrangement of computer hardware and software components such as a processing unit, a network interface, a non-transitory computer-readable medium drive, and an input/output device interface, all of which may communicate with one another by way of a communication bus. The network interface may provide for connectivity to one or more networks or computing systems. The processing unit may thus receive information and instructions from other computing devices, systems, or services via a network. The processing unit may also communicate to and from memory and further provide output information via the input/output device interface. The input/output device interface may also accept input from various input devices, such as a keyboard, mouse, digital pen, touch screen, etc. The memory of the computing device 1107 may contain computer program instructions, such as the color search module 1109, that the processing unit may execute in order to implement one or more embodiments of the present disclosure. The memory generally includes RAM, ROM and/or other persistent or non-transitory computer-readable storage media.

In addition, the memory may include a user browser. The user browser may have contacted a network site, e.g., a website, and loaded a graphic user interface based on information received from a remote server. The user browser may be used to initiate a search. For example, the user browser may obtain a color range to search, and in some embodiments additional search parameters, such as keywords, item price, type of item/object, etc. Such additional parameters may be used to further filter the search results in addition to color. The color search module 1109 may execute on the computing device 1107, either within the browser (e.g., via a JAVASCRIPT® module) or outside the browser to preprocess the range and generate one or more interleave ranges to search via the color search query 1120. At this point, the query 1120 may be sent to the color data store 1101, processed via comparison of the 24 bit integer color index to the 24 bit interleaved search ranges, and a response 1122 generated and sent back to the computing device 1107. The response 1122 may be further filtered based on additional query parameters described above. Once the response 1122 is returned, the browser or other process may generate a graphical user interface to display and/or interact with one or more of the search results.

Search performance for color data store 1101 may be improved by implementing color data store 1101 across multiple sub-data store systems. In such a scenario, each sub-data store that makes up color data store 1101 may be responsible for answering queries for specific, predefined color ranges. By way of example, in a simple scenario, color data store 1101 could be implemented by using three sub-data stores. Each sub-data store may be configured to receive queries for specific interleaved color ranges, such as sub-data store #1 responding to queries where the flat one dimensional color starts with a "0" highest order bit, sub-data store #2 responding to queries where the flat one dimensional color starts with a "10", and sub-data store #3 responding to queries where the flat one dimensional color starts with "11."

The ranges assigned to each sub-data store may be configured manually, or automatically, based on the density of index color values within each sub-data store. In one embodiment, an algorithm may configure a sub-data store to handle a larger, sparsely-populated color range, and configure another sub-data store to handle a smaller, but more densely-populated, color range. Such an algorithm may be executed without human intervention so as to adjust each sub-data store on the fly based on the population of possible results within specific color ranges. This approach may spread out the records in color data store 1101 across the sub-data stores according to the processing power of each sub-data store.

In a multiple sub-data store scenario, a computer creating a search query may then craft separate queries for each sub-data store system, send them out in parallel to each sub-data store system, and receive results in parallel. This parallelism may create a performance increase by querying multiple, smaller sub-data stores at the same time.

The color data store 1101, and in particular, a table (such as table 1105) that includes a one dimensional interleaved color mapping (e.g., a 24 bit interleaved integer) to a multi-dimensional color mapping (e.g., RGB color or an item with an affiliated color) may be generated to support fast color queries as described below in FIG. 2.

Figure 13:
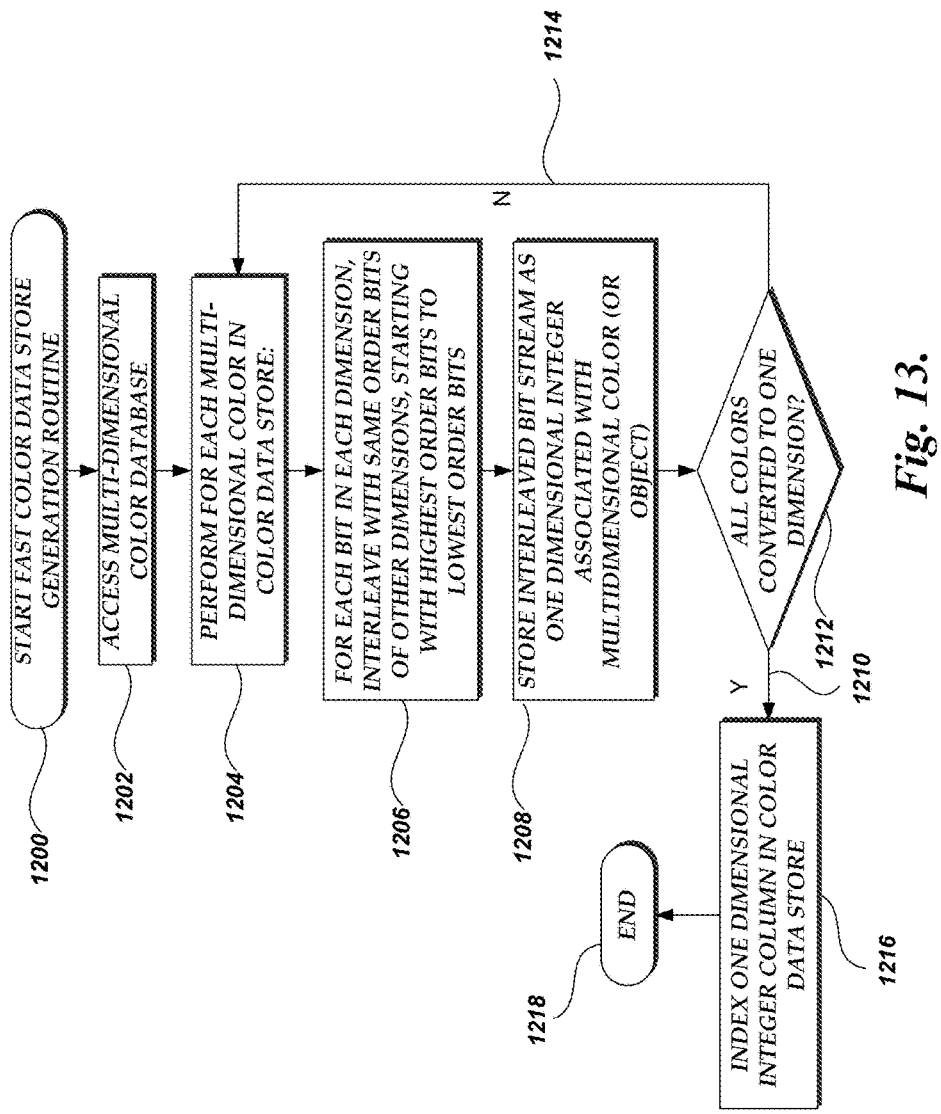
FIG. 13 is a flow diagram illustrating an example of a process for generating or configuring a fast color search data store included in FIG. 12.

With reference now to FIG. 13, an embodiment of a fast color data store generation routine 1200 is implemented by an accessing computing device, such as the computing device 1107, will be described. One skilled in the relevant art will appreciate that actions/elements outlined for routine 1200 may be implemented by one or many computing devices/components/modules that are associated with the computing device 1107, such as the color search module 1109, or associated with the color data store 1101. Accordingly, by way of example, routine 1400 has been logically associated as being performed by the computing device 1107.

At block 1202, a computing device 1107 may access the color data store 1101 (e.g., login to the data store or otherwise prepare to perform queries and store data in the data store). The accessing computing device may be computing device 1107, or any other computing device capable of interacting with the color data store 1101, including any computer device that implements the color data store 1101.

Figure 14:
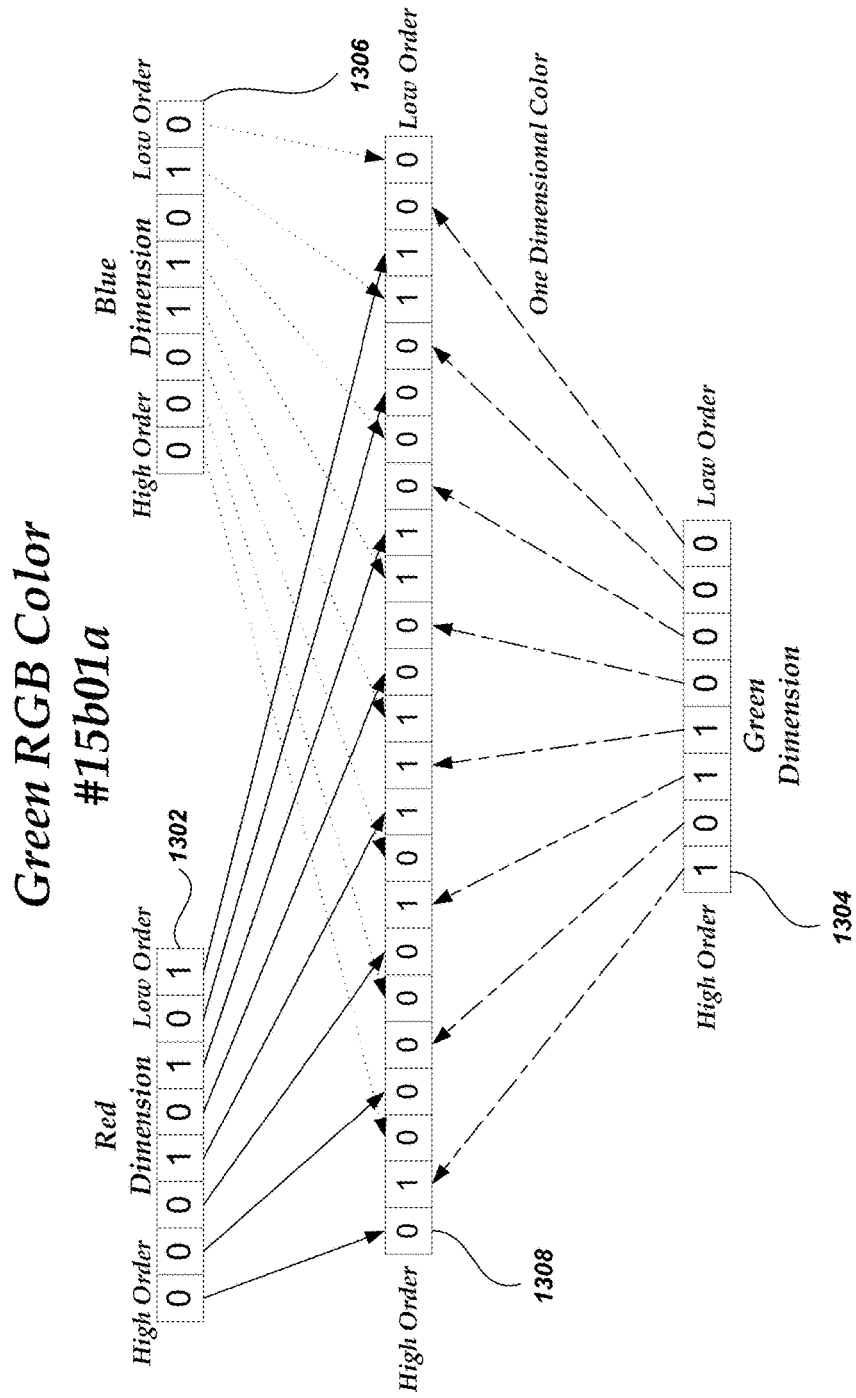
FIG. 14 is a schematic diagram illustrating an example of interleaving bits to transform a multi-dimensional color model to a one dimensional representation of a color.

At block 1204, the computing device 1107 may query and access each color used or available in the color data store 1101. Then, at block 1206, for every color in the multi-dimensional color data store 1101, the computing device may interleave the bits from each dimension of the multiple dimensions in the color data store 1101. For example, as illustrated in FIG. 14, which is further discussed below, the red dimension bits, the green dimension bits, and the blue dimension bits in an RGB color value may be interleaved to form a 24 bit integer. FIG. 14 discloses one example of how interleaving may be performed throughout this application.

In FIG. 14, the RGB color #15b01a may correspond to what is commonly known as "green." This green color, being a part of the RGB three dimensional color space, has three dimensions (red, green, and blue) that may respectively be represented in decimal (21, 176, 26), hex (15, b0, 1a) or bits (00010101, 10110000, 00011010). The bits of the red dimension 1302 may be ordered from highest to lowest, from left to right (e.g., big endian, smaller memory address to higher memory address). For example, the magnitude of a red light (e.g., LED "brightness") to display in combination with the other colors may be scaled according to the value of the red dimension. Each bit is valued according to its normally 8 bit/1 byte integer weight. Thus, a "1" in the highest order bit is valued at 128 (2 to the 7th power (27)), whereas a 1 in the lowest order bit is valued as a 1 (2^0). For the example red dimension value 1302, the values are 00010101, which are values for the bits called R7, R6, R5, R4, R3, R2, R1, and R0, respectively.

Similarly, the magnitude of the green light to display in combination with the red and blue lights may be scaled according to the bits in green dimension 1304. For the example green dimension value 1304, the values are 10110000, which are values for the bits called G7, G6, G5, G4, G3, G2, G1, and G0 respectively. Likewise, the blue dimension values 00011010 are values for the bits B7, B6, B5, B4, B3, B2, B1, and B0 respectively.

A 24 bit integer value may then be formed that interleaves all of the bits of the red, green, and blue dimension values such that their order within a dimension is preserved. For example, 24 bit integer 1308 may now include, after being interleaved, 010000010111001100001100. This value corresponds to interleaving the bits in the following order: R7 G7 B7 R6 G6 B6 R5 G5 B5 R4 G4 B4 R3 G3 B3 R2 G2 B2 R1 G1 B1 R0 G0 B0. Other possible examples may include altering the order of the RGB bits (e.g., green first G7 B7 R7 G6 B6 R6 . . . etc.), reversing the order of the bits which may, for example, be used for little ending systems (R0 G0 B0 R1 G1 B1 R2 G2 B2 R3 G3 B3 R4 G4 B4 R5 G5 B5 R6 G6 B6 R7 G7 B7, or even B0 G0 R0 B1 G1 R1 B2 G2 R2 B3 G3 R3 B4 G4 R4 B5 G5 R5 B6 G6 R6 B7 G7 R7). One skilled in the art would understand how to implement a multi-dimensional color interleaving system using little endian ordering by using a reverse bit order. Additional alternative interleaved bit orderings may also be used that allow for 24 bit integer color range searching.

Returning to FIG. 13, at block 1208, for every RGB color converted to a 24 bit integer, the 24 bit one dimensional integer may then be stored in the color data store 1101 in association with the associated multidimensional color (such as in table 1105 in association with an RGB color), which may be indirectly or directly associated with an object in the color data store such as an item (e.g., an item identifier). In some embodiments, the 24 bit integer may be stored in direct association with an object in the color data store 1101 (e.g., a mapping to an item identifier in a single table).

At block 1212, the fast color data store generation process may determine whether all colors have been converted to a single 24 bit color 212. If not, arrow 1214 indicates that the process may repeat and more colors can be converted and stored in the color data store 1101. Otherwise, as indicated by arrow 1212, the process of converting all the colors may end.

At block 1216, the color data store 1101 may then index a column in a table storing the generated one-dimensional interleaved integer representing a color to enable fast range searching based on the one-dimensional integer. After indexing, the fast color data store generation process may end at block 1218. The color data store 1101 is now able to perform a fast color search when a query is received.

Figure 15:
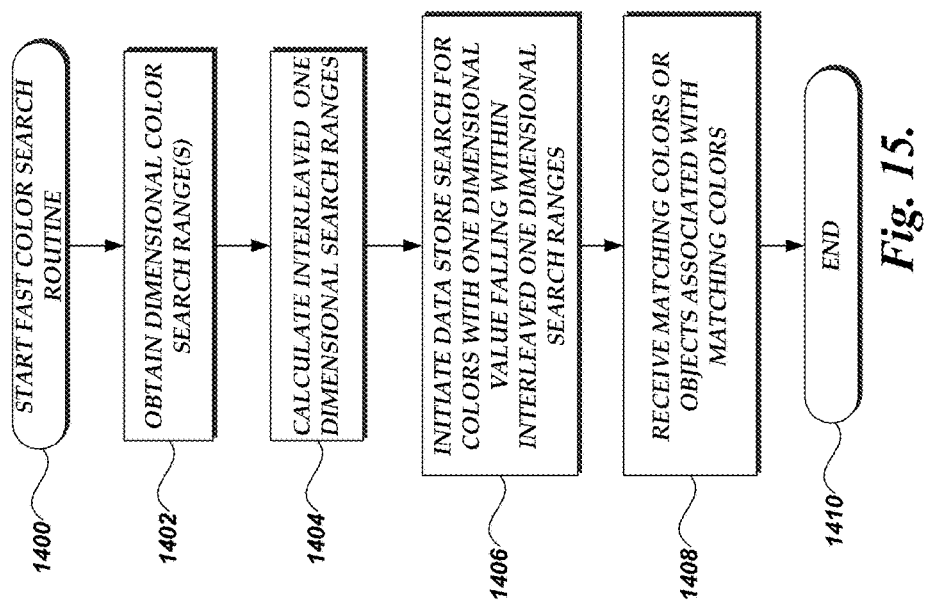
FIG. 15 is a flow diagram illustrating an example of a process for fast color searching.

FIG. 15 illustrates one embodiment of a routine executing on one or more computing devices, such as computing device 1107, for searching a fast color search data store such as color data store 1101. Such a routine may be performed by software instructions executed by a hardware processor and may include one or more components of the color search module 1109. The software instructions may be stored for execution in a non-transitory storage medium, such as one or more registers, memories, magnetic disks, flash memories, solid state drives, etc.

With further reference to FIG. 15, an embodiment of a fast color search routine 1400 implemented by an accessing computing device, such as the computing device 1107, will be described. One skilled in the relevant art will appreciate that actions/elements outlined for routine 1400 may be implemented by one or many computing devices/components/modules that are associated with the computing device 1107, such as the color search module 1109. Accordingly, routine 1400 has been logically associated as being performed by the computing device 1107.

At block 1402, the computing device 1107 obtains an input for a color range to search. In some embodiments, this input may include input from a man/machine interface, such as through a keyboard, mouse, etc., as input into a graphical user interface, such as a browser. For example, a user may browse a network site and input one or more RGB colors or color ranges to be searched. Such a color (e.g., an RGB value) may be selected via a color picker interface, a curated color palette, a color palette pulled from an image, an item that has one or more colors associated with it (e.g., to find other items with similar colors), a color determined from a keyword to color translation, or other method. In some embodiments, a color range to search may be obtained via the network, such as via a server receiving one or more packets from a client device containing color ranges to search. Various methods and systems used to obtain one or more colors or color ranges are described in U.S. patent application Ser. No. 14/316,292, entitled "BUILDING A PALETTE OF COLORS BASED ON HUMAN COLOR PREFERENCES," filed Jun. 26, 2014; U.S. patent application Ser. No. 14/316,442, entitled "BUILDING A PALETTE OF COLORS FROM A PLURALITY OF COLORS BASED ON HUMAN COLOR PREFERENCES," filed Jun. 26, 2014; U.S. patent application Ser. No. 14/315,913, entitled "DETERMINING AFFILIATED COLORS FROM KEYWORD SEARCHES OF COLOR PALETTES," filed Jun. 26, 2014; U.S. patent application Ser. No. 14/316,467, entitled "AUTOMATIC COLOR PALETTE BASED RECOMMENDATIONS FOR AFFILIATED COLORS," filed Jun. 26, 2014; U.S. patent application Ser. No. 14/316,268, entitled "AUTOMATIC IMAGE-BASED RECOMMENDATIONS USING A COLOR PALETTE," filed Jun. 26, 2014; and U.S. patent application Ser. No. 14/316,490, entitled "CREATION OF DATABASE OF SEARCHABLE COLOR NAMES," filed Jun. 26, 2014, each of which is incorporated by reference herein in its entirety.

If a color range is not obtained, but instead a single color is obtained, one or more color ranges to be searched may be determined based on one or more selected colors. In some embodiments, a color range may be determined based on a configurable color range that can be applied to a color. For example, if green color "#15b01a" is obtained, a color range may be determined by adding and subtracting from one or more color dimensions, a set value (for example, 4 color magnitude). Such an example would create a range of between (in hex) "11" to "19" in the red dimension, "ac" to "b4" in the green dimension, and "16" to "1e" in the blue dimension.

In another embodiment, the color range(s) may be determined by applying a human recognizable color distance/difference formula. Such a formula may generate one or more dimensional color ranges for a given RGB value that may be imperceptible to human detection based on a given starting color, and may be considered the same color as the starting color for human purposes. In an embodiment, the color search range may include those colors not detectable as different by a human, and/or may include those search ranges barely detectable as different by a human. Various methods and systems for determining a human perceptible color difference using a human color distance formula are described in U.S. patent application Ser. No. 14/316,483, entitled "IMAGE-BASED COLOR PALETTE GENERATION," filed Jun. 26, 2014; U.S. patent application Ser. No. 14/316,530, entitled "IMAGE-BASED COLOR PALETTE GENERATION," filed Jun. 26, 2014; U.S. patent application Ser. No. 14/316,528, entitled "IMAGE-BASED COLOR PALETTE GENERATION," filed Jun. 26, 2014; and U.S. patent application Ser. No. 14/316,549, entitled "IMAGE-BASED COLOR PALETTE GENERATION," filed Jun. 26, 2014, each of which is incorporated by reference herein in its entirety.

In yet another embodiment, the color range(s) may be determined based on the output of a previous item search through the use of a color adjustment user interface that allows for modification of a previously searched color. Unlike a color picker user interface that allows for the selection of a color, a color adjustment user interface may include a GUI slider that allows for searching, based on a given color or color range or a wider or narrower range of color; or allows the searched color or color range to be shifted to become more intense, darker, brighter, etc. The previous item search may be the result of a previous color search queried by color alone or in combination with other criteria (such as keywords, price, etc.). In such a scenario, a user interface may display all of the items such that the resulting items can be browsed and examined, and have the color adjustment user interface integrated therein. The user interface may be a network page that allows for scrolling through a plurality of search results. The network page may include a slider that allows for selection of tighter or broader color ranges.

For example, a user on computer device 107 may have selected the color green "#15b01a" from a network-based color picker user interface, and sent an item search to a network server along with the keyword "handbag." The computer device 107 may translate the green color into a color search range within a first threshold around the green color, for the query to include the color search range and the keyword "handbag," and transmitted the search criteria to color data store 1101. Once a response was received, the computing device 1107 may display all of the items and their associated images within a browser on a network page. The network page may have a slider user interface element that allows for the color search range to be adjusted upwards by sliding the interface in a first direction. Sliding in the first direction may direct computing device 1107 to resubmit the search with a wider or broader color search range than in the previous search. The color search range may be widened in a ratio consistent with an amount the slider was moved in the first direction.

Similarly, the previous color search range may be adjusted downward by a user sliding the slider in a second direction, which may cause the color search range to decrease in a ratio consistent with an amount the slider was moved in the second direction.

Once the slider or other adjustment user interface has been altered, the new search may be initiated based on the widened or narrowed color search range criteria. The search results in the response would thus be widened or narrowed in accordance with the new color search range. In this manner, a user can "see more" results matching a given color by widening a color search range, or "see less" results by narrowing the color search range.

In other embodiments, color(s) or color search range(s) may be obtained from other sources, including preexisting color palettes, opposite colors, opposite color palettes, color to keyword mappings, etc. Various methods and system for obtaining color(s) and color search range(s) are described in U.S. patent application Ser. No. 14/316,292, entitled "BUILDING A PALETTE OF COLORS BASED ON HUMAN COLOR PREFERENCES," filed Jun. 26, 2014; U.S. patent application Ser. No. 14/316,442, entitled "BUILDING A PALETTE OF COLORS FROM A PLURALITY OF COLORS BASED ON HUMAN COLOR PREFERENCES," filed Jun. 26, 2014; U.S. patent application Ser. No. 14/315,913, entitled "DETERMINING AFFILIATED COLORS FROM KEYWORD SEARCHES OF COLOR PALETTES," filed Jun. 26, 2014; U.S. patent application Ser. No. 14/316,467, entitled "AUTOMATIC COLOR PALETTE BASED RECOMMENDATIONS FOR AFFILIATED COLORS," filed Jun. 26, 2014; U.S. patent application Ser. No. 14/316,268, entitled "AUTOMATIC IMAGE-BASED RECOMMENDATIONS USING A COLOR PALETTE," filed Jun. 26, 2014; and U.S. patent application Ser. No. 14/316,490, entitled "CREATION OF DATABASE OF SEARCHABLE COLOR NAMES," filed Jun. 26, 2014, each of which is incorporated by reference herein in its entirety. Other parameters may also be specified as a part of a color search query to further filter desired results of the query. Such parameters may include keywords, item price, type of item/object, etc.

At block 1404, preprocessing may occur to form a fast color search query. For example, at block 1404, a process may generate, based on the obtained RGB color search ranges, one or more 24 bit integer search ranges to include in one or more color search queries. Further, at block 1404, one or more color search queries may be properly formulated. For example, once the 24 bit integer color search ranges have been generated, those ranges may be formed into one or more formatted SQL queries, API queries, web service queries, etc. Preprocessing is further described below with reference to FIG. 16.

At block 1406, computing device 1107 may initiate a search query. Initiating a search query may include transmitting a search query including the color range(s) to be searched over a network (e.g., local area network, Internet, VPN, etc.) by computing device 1107 to color data store 1101 or other color query enabled service such as a web service or color search server. In some embodiments, no transmission may be needed, as the color search module 1109 may have direct or local access to a color data store 1101, or may be able to execute the query itself via direct access to data store files (e.g., using SQLite).

At block 1408, once all 24 bit integer search ranges has been searched, the desired data store records that match or otherwise correlate to one or more of the searched ranges are received by the querying computing device, e.g., through a local process, or transmitted back to the computing device 1107 through the network and received by the computing device 1107. Such a search result may return one or more matching RGB colors, RGB color palettes, or even 24 bit integers that may be de-interleaved to determine an RGB color. In some embodiments, the search result may return objects (such as items) associated with the one or more 24 bit integer color search ranges that were requested in the query.

The search results may be compiled by the color data store 1101 or color search module 1109 by comparing the specified integer color search ranges in the query to the index of the 24 bit column. For example, an index may be a tree data structure where, by making integer comparisons to nodes in the tree, the tree may indicate one or more rows that match an integer search range. One advantage is that this is more efficient than a comparison of each row in the data store to the color range, or a comparison of each dimension's search range to three different indexes in a data store.

At block 1410, the color search routine may end, and the computing device 1107 may use the search results for further processing, or format and display the search results in a user application such as a browser.

Figure 16:
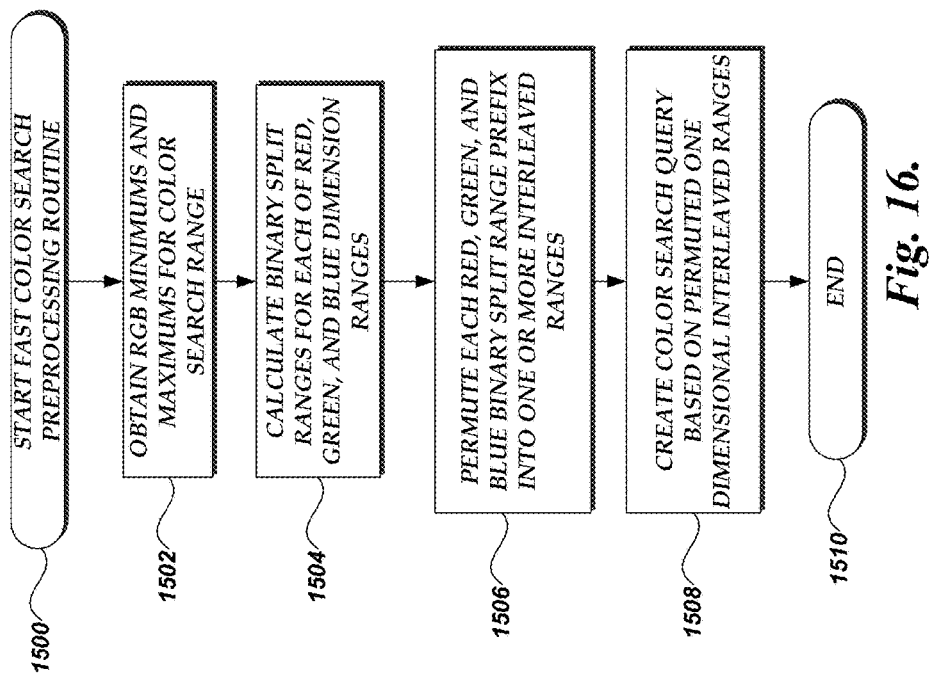
FIG. 16 is a flow diagram illustrating an example of a process for fast color search preprocessing.

With reference now to FIG. 16, an embodiment of a fast color search preprocessing routine 1500 implemented by an accessing computing device, such as the computing device 1107, will be described. One skilled in the relevant art will appreciate that actions/elements outlined for routine 1500 may be implemented by one or many computing devices/ components/modules that are associated with the computing device 1107, such as the color search module 1109, or alternatively by color data store 1101 (e.g., when RGB color range(s) are specified in a transmitted search query by a user computing device, and a server or data store must translate the received RGB color range(s) into 24 bit integer color search ranges prior to searching). Accordingly, routine 1500 has been logically associated as being performed by the computing device 1107.

FIG. 16 illustrates one embodiment's preprocessing of an RGB color search range that may be performed by the color search module 1109. One skilled in the art will see that the preprocessing may be quickly extrapolated to any other multi-dimensional color arrangement other than RGB. For example, the computing device 1107 may have a color search module 1109 including JAVASCRIPT® instructions that may run in a browser. The JAVASCRIPT® instructions may preprocess one or more color search ranges prior to forwarding the ranges to a network server or data store server for searching. One of the advantages of using JAVASCRIPT® is that the processing load of an organization's data stores and servers may be reduced by having user operated computers perform preprocessing for a color search query instead. In addition to JAVASCRIPT®, one skilled in the art will recognize that other programming languages may also be used to implement the fast color searching techniques described herein, whether the resulting code is executed on the user computer side, the server(s) side, or in some combination thereof.

At block 1502, the computing device 1107 that is performing the preprocessing may obtain RGB color range values. The color range values may include a red maximum color value, a red minimum color value, a green minimum color value, a green maximum color value, a blue maximum color value, and a blue minimum color value. Embodiments may then translate these dimensional color ranges into one or more one dimensional 24 bit integer color search ranges that may be used in a fast color search query. An example process is described below with respect to blocks 1504, 1506, and 1508.

At block 1504, each dimensional color's range (e.g., minimum to maximum) may be further split, by the computing device 1107, into additional ranges across bit boundaries so that interleaved values may appropriately be searched in one dimension. These may be called binary split ranges or prefixes.

As an illustration of the problem to be solved is as follows. Assume the color search ranges of:
Red minimum: Hex-7e Binary-01111110
Red maximum: Hex-81 Binary-10000001
Green minimum: Hex-00 Binary-00000000
Green maximum: Hex-01 Binary-00000001
Blue minimum: Hex-fe Binary-11111110
Blue maximum: Hex-ff Binary-11111111

When interleaved, the result might appear to create the search range of, in binary: 001101101101101101101000 (interleaving all the minimum values) through 101001001001001001001111 (interleaving all the maximum values), which corresponds to the decimal integer range of 3,595,112 through 10,785,359. However, matching integer based colors within that range may not actually be within the color range to be searched. For example, 4,194,304, which may correspond to the interleaved bit value 010000000000000000000000 and corresponds to the RGB color in hex of #008000 (i.e., a green value of #80), is not actually within the range to be searched (#7f00fe through #8101ff green does not vary more than between 00 and 01), but does satisfy the criteria of being between 3,595,112 and 10,785,359. This error situation may occur because of bit carryovers from the interleaved values of the various colors. In other words, the carryovers in ranges in 24 bit integer interleaved form affect other dimensions' color values, which is an unintended consequence and makes some colors match a color search range in integer format when a color does not actually match the original color search range.

Such a situation may be avoided via preprocessing before a search query is executed. For example, the preprocessing for the above range will split integer search ranges where a carryover will affect a range to be searched. Instead of searching a single integer range from 3,595,112 through 10,785,359, two ranges can be searched instead: 001101101101101101101000 through 001101101101101101101111, and 101001001001001001001000 through 101001001001001001001111, corresponding to the ranges in decimal integer of 3,595,112 to 3,595,119, and 10,785,352 to 10,785,359, respectively. These split search ranges now appropriately capture the entire search range (e.g., the original search range #7f00fe through #8101ff is equivalent to ranges #7f00fe through #7f01ff and #810fe through #8101ff combined).

In some embodiments, postprocessing, rather than preprocessing, may be used to implement a fast-color search. In embodiments where data store records sparsely populate color search ranges, the identification of split integer search ranges may be performed on computing device 1107. Under this scenario, using the same example above, color data store 1101 may be searched by computing device 1107 using the larger range 3,595,112 through 10,785,359. Because records sparsely populate that range in color data store 1101, a limited number of query results may be returned. Because only a limited number of search results are expected to be returned, computing device 1107 may determine each split search range after issuing its query to the data store (instead of before), and analyze each individual query result to determine whether it falls within any of the determined split search ranges. One of the advantages of this type of embodiment is that it moves processing from color data store 1101 (e.g., comparison of each smaller split search range) to computing device 1107, thus reducing the overall load on color data store 1101. This type of implementation may also be used in combination with a color data store 1101 made up of multiple sub-data stores because under that scenario the sparseness of each sub-data store can be controlled to make post-processing an optimal strategy.

Thus, at block 1504, binary split ranges may be determined for each RGB color dimension by determining high order bit prefixes that can be filled out with the remaining bits as 0s or 1s to determine a split search range. Binary split ranges can be determined by calculating one or more range prefixes for the minimum and maximum values of a color dimension, and combining these range prefixes into a list of range prefixes for a given dimension.

For example, for the red color search range, one prefix (the base prefix) may be identified by determining the highest order bit of the minimum value that has the value of "1" as a minimum, and then using the minimum as a lower bound with the upper bound being all previous 0s. If the red color search range was from 00001010 (minimum red value) through 00010000 (maximum red value), then aforementioned prefix may correspond to the bit prefix of 0000101 of the minimum value. This prefix may be thought of as a range (e.g., binary split range) which corresponds to a range of 00001010 through 00001011 (i.e., a range based on the prefix where the remaining bits (underlined) are all filled out with 0s for the minimum of the range, and is for the maximum of the range). Thus, the prefix value 0000101 may be added to a list of prefixes for the red color.

More prefixes may be identified by computing device 1107 based on the minimum value. One criterion for identifying additional prefixes involves examining the base prefix. Starting from the lowest bit, if there are any additional higher order bits in the base prefix that have a 0 (e.g., 0000101), an additional prefix may be identified if the additional prefix includes lower order bits than the highest order bit of the minimum value bit that equals 0, and the maximum bit of that order is a 1. This bit may be referred to as a "divergent" bit, since it is the bit where the maximum value begins to diverge from the minimum value). Such a prefix may then be finally identified by replacing the identified "0" with a "1." More than one additional prefix may exist within the base prefix.

Returning to our example, the minimum value has such a matching zero, 00001010, and the prefix includes 000010, which includes lower order bits than divergent bit (here underlined where the bit strings diverge: min: 00001010 and max: 00010000). The identified prefix contains bits of a lower order than the divergent bit (e.g., the fifth and sixth lowest order bits). Since 000010 has been identified, the actual prefix to add is 000011 (" . . . the prefixes may then be included by replacing the identified '0' with a '1'"). Thus, this would identify the additional prefix of "000011" and add it to the list of prefixes for the red color (which already contained 0000101).

Another set of prefixes may be determined by computing device 1107 by analyzing the maximum bit value for a color. The computing device 1107 may identify the lowest order bit value of the maximum value that is a 0, and taking as a prefix the identified value 0 bit, and all higher order bits. Thus, 00010000 would be added as a prefix to the growing list.

Another set of prefixes that may be added are any prefixes of the maximum value where the maximum value has a bit of "1" after the divergent bit. These prefixes may then be included by replacing the identified "1" with a "0."

In the afore-mentioned example, no additional prefixes would be identified, as the maximum red value is 00010000, and has no bits with a "1" value after the divergent bit. However, if the maximum red value was actually 00010100, then the second "1" would identify a prefix, 000101, the second "1" would then be replaced with a "0" (to form prefix 000100), and the prefix 000100 would be added to the list of red prefixes.

Although the example above determined a list of binary split ranges (e.g., a prefix list) for red values, a list of binary split ranges may be determined for the blue and green dimensions similarly, or any dimension of a color space. Thus, a list of binary split ranges/prefixes may be determined for each color dimension, and specifically for the red, green, and blue dimensions based on the maximum and minimum values in a range to be searched for each dimension.

Returning to FIG. 16, at block 1506, the prefixes may be permuted and interleaved by computing device 1107. Each such permutation may be converted into one or more 24 bit integer ranges for searching (or other n-dimensional interleaved bit integer range depending on how many bits makeup a dimension, and how many dimensions make up the color model).

For example, using RGB, there may be three prefix lists one for red, one for green and one for blue. Each prefix in the red list may be permuted with all of the other prefixes for the other colors, so that the computer determines all possible combinations of prefixes that have one prefix from the red list, one prefix from the green list, and one prefix from the blue list. Each permutation can be interleaved and converted into one or more 24 bit integer search ranges.

Figure 17:
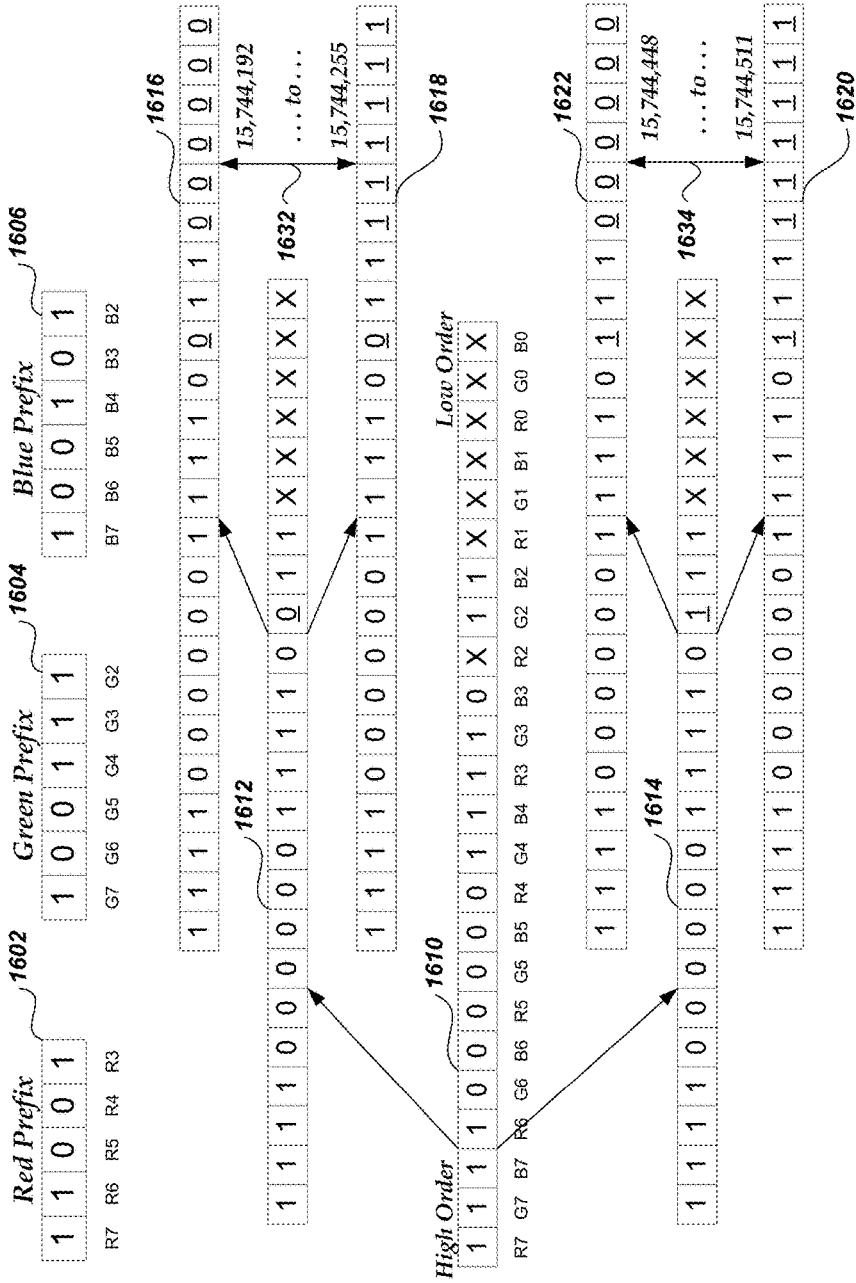
FIG. 17 is a schematic diagram illustrating an example of interleaved one dimensional color ranges computed from a permutation of range prefixes.

FIG. 17 illustrates an example of interleaving and conversion of a particular permutation by computing device 1107. For this example permutation, a red prefix 1602 has been selected (11001), a green prefix 1604 has been selected (100111), and a blue prefix 1606 has been selected (100101). These bits may then be interleaved based on their bit order, such as described in FIG. 14. However, a number of bits are not present in the prefixes. For example, the red prefix is missing the last three bits, and the blue and green prefixes are missing the last two bits. This creates an interleaved bit structure that would be incomplete. For example, interleaved bits 1610 shows an interleaved string with missing bits (Xs) based on these prefixes, and thus showing that the R2 bit is missing, and the R1, G1, B1, R0, G0, and B0 bits are also missing.

There may be two types of missing bits. The first type may be a missing bit that has lower order bits in the 24 bit integer that are defined. This may be called an "interior split bit." For example, the bit labeled R2 in interleaved bits 1610 is missing, as indicated by the "X." However, the bits G2 and B2, are defined (e.g., were included in the selected green prefix 1604 and blue prefix 1606) and are of a lower order in the 24 bit string ("lower order" here, for this 24 bit interleaved integer, means "comes after" or of a lower order when the 24 bit interleaved integer is considered a normal integer).

When a bit of the first type is identified, the permutation of red, green, and blue prefixes may be split into two identical permutations for further range determination, where a first permutation 1612 has a "0" for the identified bit, and a second permutation 1614 has a "1" for the identified bit (as indicated by the underlined bit values in interleaved 24 bit integers 1612 and 1614). Further missing bit analysis may then be performed on these two similar permutations of the prefixes with only one bit of difference. The original permutation, here permutation 1610, need not be further analyzed. This type of split may be performed again and again until there are no more interior split bits within any of the resulting permutations.

A second type of missing bit may also be identified. This missing bit may be identified by determining that the missing bit does not have any defined bits of a lower order. For reference, this missing bit may be called an "ending range bit." When this type of bit is identified, and usually after all interior split bits have been resolved through a split into two identical permutations with only a one bit difference, then a permutation may be converted to a 24 bit range. This is done by calculating two 24 bit integers: a lower bound of the range which is determined by taking the permutation and setting all remaining ending range bits to "0," and another upper bound of the range which is determined by taking the permutation and setting all remaining ending range bits to "1."

For example, interleaved 24 bit permutations 1612 and 1614 have remaining ending range bits, corresponding to R1, G1, B1, R0, G0, and B0 (in other words, the last 6 bits of the interleaved 24 bit integer). Because there are no defined bits of lower order than the ending range bits, these bits may now be used to form an integer search range. For permutation 1612, the lower bound may be determined by setting the ending range bits to 0 (as shown in permutation 616), which equals the integer 15,744,192. The upper bound may be determined by setting the ending range bits to 1 (as shown in permutation 1618), which equals the integer 15,744,255. Thus, one calculated search range 1632 may be a query range for an interleaved color value between 15,744, 192 and 15,744,255.

For permutation 1614, the lower bound may be determined by setting the ending range bits to 0 (as shown in permutation 1622), which equals the integer 15,744,448. The upper bound may be determined by setting the ending range bits to 1 (as shown in permutation 1620), which equals the integer 15,744,511. Thus, one calculated search range 634 may be a query range for an interleaved color value between 15,744,448 and 15,744,511. All of the identified 24 bit color search ranges, over all of the permutations of prefixes, may be collected and stored to be searched.

Returning to FIG. 16, after determining one or more permuted one dimensional interleaved color search ranges as described above, one or more color search queries may be formed at block 1508. One example embodiment may generate an SQL "where" clause to string together multiple 24 bit integer color search ranges in a query (e.g., an SQL "select" statement). For example, a clause such as "SELECT * FROM <table 1105> WHERE (interleave_rgb_color BETWEEN 15744448 AND 15744511) OR (interleave_rgb_color BETWEEN 15744192 AND 15744255)," where the query lists all search ranges, may be one such crafted query based on the examples above. However, the query would likely be much longer if there are further permutations of red, green, and blue prefixes that may be combined to form unique search ranges, each of which may produce one or more search ranges depending on the number of interior split bits. All of the resulting ranges may be used to form a query, or multiple queries, for total range coverage of a traditional multi-dimensional color search query. In other embodiments, a properly formatted web service query may incorporate the determined integer color ranges to search by adding the ranges as parameters to a search.

After the search query(ies) are generated, at block 1510, the preprocessing routine may end. The search may now be transmitted or executed, as described with reference to FIG. 15 (e.g., block 1406).

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal. A software module can comprise computer-executable instructions which cause a hardware processor to execute the computer-executable instructions. The computer-executable instructions can comprise a scripted computer language and/or a compiled computer language. Computer-executable instructions can comprise, for example and without limitation, JAVASCRIPT®, PYTHON™, php, SQL, C, C++, JAVA®, C#, Fortran, BASIC, shell scripts, Perl, or the like.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
   a non-transitory computer-readable storage medium configured to store an electronic catalog comprising a plurality of items, wherein each item of the plurality of items is associated with an image and textual data that is descriptive of the item, and wherein the electronic catalog further comprises at least an inaccuracy where some textual data inaccurately describes the item; and
   a hardware processor in communication with the non-transitory computer-readable storage medium, the hardware processor configured to execute computer-executable instructions to at least:
   receive a first image associated with a first item from the electronic catalog, wherein the first image comprises a first plurality of colors;
   retrieve first textual data associated with the first item;
   obtain a predetermined color palette comprising a second plurality of colors, the predetermined color palette associated with a second color palette name comprising second textual data;

determine a first color range based at least in part on a color threshold from a first color of the first plurality of colors in a color space, wherein the color space corresponds to a mathematical color model, and wherein the first color within the mathematical color model corresponds to a coordinate;

compare the first color to a second color from the second plurality of colors, based at least in part on the second color being within the first color range, to determine that the first color corresponds to the second color, wherein comparing the first color to the second color further comprises:

calculating an integer search range, wherein calculating the integer search range further comprises interleaving bits from the first color range;

initiating a search of a data store based at least in part on a search query comprising the integer search range as a search parameter, the data store comprising a record associated with at least one indexed integer color value; and receiving a search result from the data store, the search result comprising a first record associated with a first indexed integer color value for the second color;

compare a third color from the first plurality of colors to a fourth color from the second plurality of colors to determine that the third color corresponds to the fourth color;

identify the inaccuracy, wherein identifying the inaccuracy comprises:

comparing the first textual data and the second color palette name based at least on one of partial textual matching or textual matching of the first textual data and the second textual data to determine a difference between the first textual data and the second palette color name; and in response to identifying the inaccuracy, update the first textual data of the first item of the electronic catalog to generate updated first textual data.

2. The system of claim 1, wherein the second color palette name corresponds to user input data.

3. The system of claim 1, wherein the hardware processor is further configured to execute computer-executable instructions to at least:

generate a user interface, wherein the user interface is configured to display the first image, the first textual data, and the second color palette name.

4. The system of claim 1, wherein the hardware processor is further configured to execute computer-executable instructions to at least:

delete the first textual data of the first item of the electronic catalog.

5. A computer-implemented method comprising:

under control of a hardware computing device configured with specific computer-executable instructions, receiving a first image associated with a first item from an electronic catalog comprising a plurality of items, wherein the first image comprises a first plurality of colors, wherein each item of the plurality of items is associated with an image and textual data that is descriptive of the item, and wherein the electronic catalog further comprises at least an inaccuracy where some textual data inaccurately describes the item;

retrieving first textual data associated with the first item;

obtaining a predetermined color palette comprising a second plurality of colors, the predetermined color palette associated with a second color palette name comprising second textual data;

determining a first color range based at least in part on a color threshold from a first color of the first plurality of colors in a color space, wherein the color space corresponds to a mathematical color model, and wherein the first color within the mathematical color model corresponds to a coordinate;

comparing the first color to a second color from the second plurality of colors, based at least in part on the second color being within the first color range, to determine that the first color corresponds to the second color, wherein comparing the first color to the second color further comprises:

calculating an integer search range, wherein calculating the integer search range further comprises interleaving bits from the first color range;

initiating a search of a data store based at least in part on a search query comprising the integer search range as a search parameter, the data store comprising a record associated with at least one indexed integer color value; and receiving a search result from the data store, the search result comprising a first record associated with a first indexed integer color value for the second color;

comparing a third color from the first plurality of colors to a fourth color from the second plurality of colors to determine that the third color corresponds to the fourth color;

identifying the inaccuracy, wherein identifying the inaccuracy comprises:

comparing the first textual data and the second color palette name based at least on a textual comparison between the first textual data and the second textual data to determine a difference between the first textual data and the second palette color name; and in response to identifying the inaccuracy, updating the first textual data of the first item of the electronic catalog to generate updated first textual data.

6. The computer-implemented method of claim 5, wherein the textual comparison comprises at least one of partial textual matching, textual matching, or natural language processing.

7. The computer-implemented method of claim 5, further comprising:

generating a user interface, wherein the user interface is configured to display the first image, the first textual data, and the second color palette name.

8. The computer-implemented method of claim 5, wherein the second color palette name corresponds to user input data.

9. The computer-implemented method of claim 5, further comprising:

determining a second color range based at least in part on a second color threshold from the third color in the color space, wherein comparing the third color to the fourth color further comprises determining that the fourth color is within the second color range.

10. The computer-implemented method of claim 5, further comprising:

generating a notification alert.

11. The computer-implemented method of claim 5, further comprising:
deleting the first textual data of the first item of the electronic catalog.

12. A non-transitory computer-readable storage medium storing computer executable instructions that when executed by a processor perform operations comprising:
receiving a first image associated with a first item from an electronic catalog comprising a plurality of items, wherein the first image comprises a first plurality of colors, wherein each item of the plurality of items is associated with an image and textual data that is descriptive of the item, and wherein the electronic catalog further comprises at least an inaccuracy where some textual data inaccurately describes the item;
retrieving first textual data associated with the first item;
obtaining a predetermined color palette comprising a second plurality of colors, the predetermined color palette associated with a second color palette name comprising second textual data;
determining a first color range based at least in part on a color threshold from a first color of the first plurality of colors in a color space, wherein the color space corresponds to a mathematical color model, and wherein the first color within the mathematical color model corresponds to a coordinate;
comparing the first color to a second color from the second plurality of colors, based at least in part on the second color being within the first color range, to determine that the first color corresponds to the second color, wherein comparing the first color to the second color further comprises:
calculating an integer search range, wherein calculating the integer search range further comprises interleaving bits from the first color range;
initiating a search of a data store based at least in part on a search query comprising the integer search range as a search parameter, the data store comprising a record associated with at least one indexed integer color value; and
receiving a search result from the data store, the search result comprising a first record associated with a first indexed integer color value for the second color;
comparing a third color from the first plurality of colors to a fourth color from the second plurality of colors to determine that the third color corresponds to the fourth color;
identifying the inaccuracy, wherein identifying the inaccuracy comprises:
comparing the first textual data and the second color palette name based at least on a textual comparison between the first textual data and the second textual data to determine a difference between the first textual data and the second palette color name; and
in response to identifying the inaccuracy, updating the first textual data of the first item of the electronic catalog to generate updated first textual data.

13. The non-transitory computer-readable storage medium of claim 12, wherein the textual comparison comprises at least one of partial textual matching, textual matching, or natural language processing.

14. The non-transitory computer-readable storage medium of claim 12, the operations further comprising:
generating a user interface, wherein the user interface is configured to display the first image, the first textual data, and the second color palette name.

15. The non-transitory computer-readable storage medium of claim 12, wherein obtaining the predetermined color palette is further based at least in part on voting data associated with the predetermined color palette.

16. The non-transitory computer-readable storage medium of claim 12, the operations further comprising:
comparing each remaining color from the first plurality of colors to a respective remaining color from the second plurality of colors.

17. The non-transitory computer-readable storage medium of claim 12, the operations further comprising:
determining a second color range based at least in part on a second color threshold from the third color in the color space, wherein comparing the third color to the fourth color further comprises determining that the fourth color is within the second color range.

18. The non-transitory computer-readable storage medium of claim 12, the operations further comprising:
deleting the first textual data of the first item of the electronic catalog.

19. The non-transitory computer-readable storage medium of claim 12, the operations further comprising generating a notification alert.

20. The non-transitory computer-readable storage medium of claim 12, the operations further comprising:
receiving user input data, wherein the updated first textual data comprises the user input data.

* * * * *